(12) United States Patent  (10) Patent No.: US 9,125,098 B2
Zhang et al.  (45) Date of Patent: Sep. 1, 2015

(54) METHOD AND APPARATUS FOR FLOW CONGESTION CONTROL IN MULTIFLOW NETWORKS

(75) Inventors: Danlu Zhang, San Diego, CA (US); Weiyan Ge, Beijing (CN); Rohit Kapoor, San Diego, CA (US); Bibhu Prasad Mohanty, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/563,162

(22) Filed: Jul. 31, 2012

(65) Prior Publication Data

US 2013/0194924 A1 Aug. 1, 2013

Related U.S. Application Data

(60) Provisional application No. 61/514,858, filed on Aug. 3, 2011, provisional application No. 61/522,178, filed on Aug. 10, 2011.

(51) Int. Cl.
 *H04W 28/10* (2009.01)
 *H04W 28/02* (2009.01)
 *H04W 92/12* (2009.01)
(52) U.S. Cl.
 CPC .......... *H04W 28/10* (2013.01); *H04W 28/0247* (2013.01); *H04W 92/12* (2013.01)
(58) Field of Classification Search
 CPC ............................. H04W 28/02; H04W 28/10
 See application file for complete search history.

(56) References Cited

U.S. PATENT DOCUMENTS 7,242,670 B2 7/2007 Yi et al.
7,551,596 B2 6/2009 Kim et al.
(Continued)

FOREIGN PATENT DOCUMENTS

CN 1713633 A 12/2005
CN 1951052 A 4/2007
(Continued)

OTHER PUBLICATIONS

Integrating Admission Control and Packet Scheduling for Quality Controlled Streaming Services in HSDPA Networks Gomes, J.S.; Choi, H.-A; Jae-Hoon Kim; JungKyo Sohn; Hyeong-In Choi, "Integrating admission control and packet scheduling for quality controlled streaming services in HSDPA networks," Broadband Communications, Networks and Systems, 2007.*

(Continued)

*Primary Examiner* — Andrew Lai
*Assistant Examiner* — Hoyet H Andrews, III
(74) *Attorney, Agent, or Firm* — Charles Chesney

(57) ABSTRACT

The present disclosure provides methods and apparatuses for improved Iub link congestion management based on a dynamic scaling of flow control request message transmission in multiflow wireless environments. For example, in an aspect, methods and apparatuses are provided for receiving, at a NodeB, a data request from one or more user equipment (UE), wherein each data request corresponds to a flow and the one or more UE is served by a plurality of NodeBs, generating a flow control request corresponding to each flow in response to each data request, and sending each flow control request to a radio network controller (RNC). Thereafter, a Node B may receive data in response to each flow control request, determine a congestion state based on a downlink delay from the RNC detected in the received data, and scale a subsequent one or more flow control requests based on the determined congestion state.

29 Claims, 13 Drawing Sheets

(56) References Cited

U.S. PATENT DOCUMENTS

| | | |
|---|---|---|
| 7,558,226 B2 | 7/2009 | Anderson et al. |
| 7,710,922 B2 | 5/2010 | Lundh et al. |
| 7,729,349 B2 | 6/2010 | Beckmann et al. |
| 7,864,722 B2 | 1/2011 | Yi et al. |
| 7,903,578 B2 | 3/2011 | Fischer |
| 7,944,943 B2 | 5/2011 | Kekki et al. |
| 7,961,704 B2 | 6/2011 | Meyer et al. |
| 8,068,473 B2 | 11/2011 | Chun et al. |
| 8,068,497 B2 | 11/2011 | Terry et al. |
| 8,094,618 B2 | 1/2012 | Yi et al. |
| 8,144,662 B2 | 3/2012 | Xing et al. |
| 8,638,773 B2 | 1/2014 | Ho et al. |
| 8,737,211 B2 | 5/2014 | Zhang et al. |
| 2002/0021714 A1 | 2/2002 | Seguin |
| 2003/0129982 A1 | 7/2003 | Perini |
| 2003/0171118 A1 | 9/2003 | Miya |
| 2003/0198204 A1 | 10/2003 | Taneja et al. |
| 2004/0013089 A1* | 1/2004 | Taneja et al. ............... 370/235 |
| 2004/0224691 A1 | 11/2004 | Hadad |
| 2005/0044130 A1 | 2/2005 | Sillasto et al. |
| 2005/0074024 A1 | 4/2005 | Kim et al. |
| 2006/0033323 A1 | 2/2006 | Reynolds |
| 2006/0126507 A1* | 6/2006 | Nakayasu ............... 370/229 |
| 2006/0203760 A1 | 9/2006 | Fukui et al. |
| 2006/0274712 A1 | 12/2006 | Malladi et al. |
| 2006/0276214 A1 | 12/2006 | Harris et al. |
| 2007/0008990 A1 | 1/2007 | Torsner |
| 2007/0104150 A1 | 5/2007 | Fernandez-Corbaton et al. |
| 2008/0069043 A1 | 3/2008 | Kimura et al. |
| 2008/0102877 A1* | 5/2008 | Suemitsu et al. ............ 455/522 |
| 2008/0132263 A1 | 6/2008 | Yu et al. |
| 2008/0225789 A1 | 9/2008 | Kim et al. |
| 2008/0298322 A1 | 12/2008 | Chun et al. |
| 2008/0298332 A1 | 12/2008 | Erami |
| 2009/0010213 A1 | 1/2009 | Yamada et al. |
| 2009/0036061 A1 | 2/2009 | Chun et al. |
| 2009/0041001 A1 | 2/2009 | Lee et al. |
| 2009/0103445 A1 | 4/2009 | Sammour et al. |
| 2009/0193310 A1 | 7/2009 | Hashimoto |
| 2009/0213729 A1 | 8/2009 | Zhang et al. |
| 2009/0219881 A1 | 9/2009 | Kim |
| 2009/0245178 A1 | 10/2009 | Gholmieh et al. |
| 2009/0245212 A1 | 10/2009 | Sambhwani et al. |
| 2009/0257387 A1 | 10/2009 | Gholmieh et al. |
| 2009/0270103 A1 | 10/2009 | Pani et al. |
| 2009/0296643 A1 | 12/2009 | Cave et al. |
| 2009/0296798 A1 | 12/2009 | Banna et al. |
| 2009/0300456 A1 | 12/2009 | Pelletier et al. |
| 2009/0310534 A1 | 12/2009 | Lindskog et al. |
| 2009/0323639 A1 | 12/2009 | Kim et al. |
| 2009/0327830 A1 | 12/2009 | Lee et al. |
| 2010/0002645 A1* | 1/2010 | Ke et al. ............ 370/329 |
| 2010/0034087 A1 | 2/2010 | De Benedittis et al. |
| 2010/0034114 A1 | 2/2010 | Kim et al. |
| 2010/0034169 A1 | 2/2010 | Maheshwari et al. |
| 2010/0034171 A1 | 2/2010 | Pelletier et al. |
| 2010/0034176 A1 | 2/2010 | Heo et al. |
| 2010/0067483 A1 | 3/2010 | Ahluwalia |
| 2010/0110985 A1 | 5/2010 | Umesh et al. |
| 2010/0118723 A1 | 5/2010 | Pani et al. |
| 2010/0130137 A1 | 5/2010 | Pelletier et al. |
| 2010/0165830 A1 | 7/2010 | Amir et al. |
| 2010/0222059 A1 | 9/2010 | Pani et al. |
| 2010/0233962 A1 | 9/2010 | Johansson et al. |
| 2010/0238803 A1* | 9/2010 | Racz et al. ............ 370/235 |
| 2010/0238829 A1 | 9/2010 | Sambhwani et al. |
| 2010/0265883 A1 | 10/2010 | Attar et al. |
| 2010/0296511 A1 | 11/2010 | Prodan et al. |
| 2010/0303054 A1 | 12/2010 | Yang et al. |
| 2011/0038313 A1 | 2/2011 | Park et al. |
| 2011/0044168 A1 | 2/2011 | Nadas et al. |
| 2011/0044297 A1 | 2/2011 | Lee et al. |
| 2011/0122962 A1 | 5/2011 | De et al. |
| 2011/0164560 A1 | 7/2011 | Ki et al. |
| 2011/0170495 A1 | 7/2011 | Earnshaw et al. |
| 2011/0222502 A1 | 9/2011 | Aminaka |
| 2011/0228756 A1 | 9/2011 | Kim et al. |
| 2011/0235519 A1 | 9/2011 | Racz et al. |
| 2011/0235528 A1 | 9/2011 | Racz et al. |
| 2011/0317642 A1 | 12/2011 | Eravelli et al. |
| 2011/0317657 A1 | 12/2011 | Chmiel et al. |
| 2012/0039169 A1 | 2/2012 | Susitaival et al. |
| 2012/0057560 A1 | 3/2012 | Park et al. |
| 2012/0082096 A1 | 4/2012 | Cave et al. |
| 2012/0163161 A1 | 6/2012 | Zhang et al. |
| 2012/0163205 A1 | 6/2012 | Zhang et al. |
| 2012/0163315 A1 | 6/2012 | Govindappa et al. |
| 2012/0163338 A1 | 6/2012 | Zhang et al. |
| 2012/0201219 A1 | 8/2012 | Wager et al. |
| 2012/0201226 A1 | 8/2012 | Sambhwani et al. |
| 2012/0281564 A1 | 11/2012 | Zhang et al. |
| 2012/0320867 A1 | 12/2012 | Sarkkinen et al. |
| 2013/0016841 A1 | 1/2013 | Fong et al. |
| 2013/0115973 A1* | 5/2013 | Wigren et al. ............ 455/456.2 |
| 2013/0121247 A1 | 5/2013 | Seo et al. |
| 2013/0155923 A1 | 6/2013 | Yi et al. |
| 2013/0194921 A1 | 8/2013 | Zhang et al. |
| 2014/0056238 A1 | 2/2014 | Nammi et al. |
| 2014/0112255 A1 | 4/2014 | Kim et al. |
| 2014/0153520 A1 | 6/2014 | Shinohara et al. |

FOREIGN PATENT DOCUMENTS

| | | |
|---|---|---|
| CN | 101675684 A | 3/2010 |
| CN | 101720562 A | 6/2010 |
| EP | 1284583 A2 | 2/2003 |
| EP | 1523134 A1 | 4/2005 |
| EP | 1672845 A1 | 6/2006 |
| EP | 1675426 A2 | 6/2006 |
| EP | 1773009 A2 | 4/2007 |
| EP | 1868394 A1 | 12/2007 |
| EP | 1950903 A1 | 7/2008 |
| EP | 2015526 A2 | 1/2009 |
| JP | H11220430 A | 8/1999 |
| JP | 2000078063 A | 3/2000 |
| JP | 2005304060 A | 10/2005 |
| JP | 2007043331 A | 2/2007 |
| JP | 2007053679 A | 3/2007 |
| JP | 2007536793 A | 12/2007 |
| JP | 2008053851 A | 3/2008 |
| JP | 2008515301 A | 5/2008 |
| JP | 2008527908 A | 7/2008 |
| JP | 2009537083 A | 10/2009 |
| JP | 2010028714 A | 2/2010 |
| JP | 2010515357 A | 5/2010 |
| JP | 2010530197 A | 9/2010 |
| JP | 2011525336 A | 9/2011 |
| JP | 2013543706 A | 12/2013 |
| WO | WO0230144 A1 | 4/2002 |
| WO | WO03017711 A1 | 2/2003 |
| WO | 03045076 A2 | 5/2003 |
| WO | WO-2005041493 A1 | 5/2005 |
| WO | 2006034747 A1 | 4/2006 |
| WO | WO 2006034747 A1 * | 4/2006 |
| WO | WO 2006075951 A1 * | 7/2006 |
| WO | WO2006103136 A1 | 10/2006 |
| WO | 2007050238 A1 | 5/2007 |
| WO | 2007131558 A1 | 11/2007 |
| WO | WO 2007131558 A1 * | 11/2007 |
| WO | WO-2008085351 A1 | 7/2008 |
| WO | WO2008097544 A2 | 8/2008 |
| WO | 2008156268 A2 | 12/2008 |
| WO | 2009031485 A1 | 3/2009 |
| WO | WO-2009108808 | 9/2009 |
| WO | WO2009155480 A1 | 12/2009 |
| WO | WO-2010064365 A1 | 6/2010 |
| WO | 2010088538 | 8/2010 |
| WO | 2010106663 A1 | 9/2010 |

(56) References Cited

FOREIGN PATENT DOCUMENTS

| WO | 2010125738 A1 | 11/2010 |
|---|---|---|
| WO | WO2010132186 A1 | 11/2010 |

OTHER PUBLICATIONS

Nádas, S.; Rácz, S.; Nagy, Z.; Molnar, S., "Providing Congestion Control in the Iub Transport Network for HSDPA," Global Telecommunications Conference, 2007. Globecom '07. IEEE , vol., No., pp. 5293,5297, Nov. 26-30, 2007 doi: 10.1109/GLOCOM.2007.1003.*
Necker, M.C.; Weber, A, "Parameter Selection for HSDPA Iub Flow Control,"Wireless Communication Systems, 2005. 2nd International Symposium on , vol., No., pp. 233,237, 7-7 Sep. 2005 doi: 10.1109/ISWCS.2005.1547693.*
3GPP R1-106393, titled System performance of SFDC-HSDPA; Document for: Discussion (106393 hereinafter) was published as 3GPP TSG RAN WG1 Meeting #63; R1-106393; Jacksonville, USA, Nov. 15-19, 2010; Agenda item: 5.5; Source: Huawei, HiSilicon, pp. 01-07.*
3GPP R1-110126 et al., titled "DL Scheduling, RLC and Flow Control assumption for Inter-NodeB Multi-Point Transmissions", Document for: Discussion, (110126 hereinafter) was published as 3GPP TSG RAN WG1 Meeting #63; R1-110126, Dublin, Ireland, Jan. 17-21, 2011; Agenda item: 5.4; Source: Qualcomm Incorporated, pp. 01-09.*
R1-106393; 3GPP TSG RAN WG1 Meeting #63 R1-106393; Jacksonville, USA, Nov. 15-19, 2010; Agenda item: 5.5 Source: Huawei, HiSilicon; Title: System performance of SFDC-HSDPA; Document for: Discussion.*
R1-110126; 3GPP TSG RAN WG1 Meeting #63; R1-110126; Dublin, Ireland, Jan. 17-21, 2011; Source: Qualcomm Incorporated; Title: DL Scheduling, RLC and Flow Control assumption for Inter-NodeB Multi-Point Transmissions; Agenda item: 5.4 Document for: Discussion.*
Qualcomm Incorporated: "On deploying DC-HSDPA UEs in Single Frequency Networks", 3GPP TSG-RAN WG1#61b R1-103859, Jun. 21, 2010.
GSM: "Digital cellular telecommunications system (Phase 2+), General Packet Radio Service (GPRS), Mobile Station (MS)—Base Station System (BSS) interface, Radio Link Control/Medium Access Control (RLC/MAC) protocol (GSM 04.60 proposed version 6.1.0, Release 1997)", Draft EN 301 349 V6.1.0 (Aug. 1998), pp. 1-152.
Anand J, et al: "Architecture, implementation, and evaluation of a concurrent multi-path real-time transport control protocol," Military Communications Conference, 2007. Milcom 2007. IEEE. IEEE, Piscataway, NJ, USA, Oct. 29, 2007, pp. 1-7, XP031232821, Introduction sections II.A and II.B.
Catt: "Implicit Feedback in Support of Downlink CoMP", 3GPP Draft; R1-093522, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351782,[retrieved on Aug. 19, 2009] paragraphs 2.1 to 2.2.
Catt: "Measurement in CA", 3GPP Draft; R2-095485, 3rd Generation Partnership Project (3GPP), Mobile Competence Centre ; 650, Route Des Lucioles ; F-06921 Sophia-Antipolis Cedex ; France, no. Miyazaki; Oct. 12, 2009, Oct. 16, 2009, XP050390041, [retrieved on Oct. 4, 2009] paragraphs [02.2], [02.3].
Dong, Yu, et al: "A concurrent transmission control protocol," Communications, Circuits, and Systems Proceedings, 2006 International Conference on, IEEE, PI, Jun. 1, 2006, pp. 1796-1800, XP031010769, abstract, section II.
ETSI: "Digital cellular telecommunications system (Phase 2+),General Packet Radio Service (GPRS), Mobile Station (MS)—Base Station System (BSS) interface, Radio Link Control/ Medium Access Control (RLC/MAC) protocol (GSM 04.60 proposed version 1.1.0)", GSM 04.60, Feb. 19, 1998, pp. 48-51, XP000002657121, Retrieved from the Internet: URL:ww.etsi.org [retrieved on Aug. 18, 2011].
MCC Support: "Final Report of 3GPP TSG RAN WG1 #56bis v2.0.0 (Seoul, South Korea, Mar. 23 27, 2009)",3GPP Draft; Final-ReportWG1#56B-V200, 3rd Generation Partnership Project (3GPP), Mobile Competence Centre ; 650, Route Des Lucioles ; F-06921 Sophia-Antipolis Cedex France, San Francisco, USA; May 5, 2009, XP050339215,[ retrived on May 5, 2009] p. 11-p. 13-p. 14 p. 43-p. 44 p. 54-p. 55.
Nadas et al., "Providing Congestion Control in the Iub Transport Network for HSDPA," Global Telecommunications Conference 2007, Ericsson Research, Globecom '07, IEEE, Nov. 26-30, 2007, 5 pages.
Nokia Siemens Networks et al: "Multi-cell transmission techniques for HSDPA", 3GPP Draft; R1-104913, 3rd Generation Partnership Project (3GPP), Mobile Competence Centre ; 650, Route Des Luci0les ; F-06921 Sophia-Antip0lis Cedex ; France, vol. RAN WG1, no. Madrid, Spain; Aug. 23, 2010, Aug. 17, 2010, XP050450059, [retrieved on Aug. 17, 2010] paragraphs [003.], [03.5], [04.1].
Qualcomm Europe: "TP for feedback in support of DL CoMP for LTEA TR", 3GPP Draft; R1-092290 TP for TR 36.814 on DL Comp Feedback, 3rd Generation Partnership Project (3GPP), Mobile Competence Centre ; 650, Route Des Lucioles ; F-06921 Sophia-Antipolis Cedex; France, no. San Francisco, USA; Jun. 9, 2009, XP050339699, [retrieved on Jun. 9, 2009].
Qualcomm Incorporated: "DL Scheduling, RLC and Flow Control assumption for Inter-NodeB Multi-Point Transmissions", 3GPP Draft; R1-110126_DL_SCH_RLC_FLOW_CONTROL_ASS_INTER-NODEB_MP-HSDPA, 3rd Generation Partnership Project (3GPP), Mobile Competence Centre ; 650, Route Des Lucioles ; F-06921 Sophia-Antipolis Cedex ;France, vol. RAN WG1, no. Dublin, Ireland; Jan. 17, 2011, Jan. 11, 2011, XP050474375.
Qualcomm Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol . RAN-WG1, no. Dresden, Germany; Jun. 29, 2010 Jul. 5, 2010, XP002633072, Retrieved from the Internet: URL:http://www.3gpp.org/ftp/tsg_ran/WG1_RL 1/TSGR1_61b/Docs/R1-104157.zip [retrieved on Apr. 14, 2011].
Qualcomm Incorporated: "On Inter-site Multi-Point Transmission in HSDPA", 3GPP Draft; R2-115196 on Inter-Site Multi-Point Transmisston in HSDPA, 3rd Generation Partnership Project (3GPP), Mobile Competence Centre ; 650, Route Des Lucioles ; F-06921 Sophia-Antipolis Cedex ; France, vol. RAN WG2, no. Zhuhai; Oct. 10, 2011, Oct. 4, 2011, XP050540985, [retrieved on Oct. 4, 2011] paragraphs [02.3] , [0003] figure 2; table 1.
Samsung: "Selection of primary scheduling Node B in SHO", 3GPP Draft; R1-040492, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; May 6, 2004, XP050098858.
Sharp, "Simultaneous Retransmission of Different Redundancy Versions during the HARQ for DL CoMP," 3GPP TSG-RAN WG1#58Bis, R1-094026, Miyazaki, Japan, Oct. 12-16, 2009, pp. 1-3.
Vulkan et al., "Congestion Control in Evolved HSPA Systems," 2011 IEEE 73rd Vehicular Technology Conference (VTC Spring), pp. 1-6.
David Soldani et al: "Strategies for Mobile Broadband Growth: Traffic Segmentation for Better Customer Experience", Vehicular Technology Conference (VTC Spring), 2011 IEEE 73rd, IEEE, May 15, 2011, pp. 1-5, XP031896606, DOI : 10.1109/VETECS.2011.5956203 ISBN: 978-1-4244-8332-7.
Ericsson: "Iub and Iur Congestion Control Concept for HSUPA and HSDPA", 3GPP Draft; R3-050545 Iubiur Cong Ctrl Disc, 3rd Generation Partnership Project (3GPP), Mobile Competence Centre ; 650, Route Des Lucioles ; F-06921 Sophia-Antipolis Cedex ; France, vol. RAN WG3, no. Athens, Greece; May 4, 2005, XP050157970, [retrieved on May 4, 2005].
International Search Report and Written Opinion—PCT/US2012/049513—ISA/EPO—Nov. 13, 2012.
Nokia: "Number of Control Symbols", 3GPP Draft; R2-071227 Number of Control Symbols, 3rd Generation Partnership Project (3GPP), Mobile Competence Centre ; 650, Route Des Lucioles ; F-06921 Sophia-Anti Polis Cedex ; France, vol. RAN WG2, no. S t .

(56) References Cited

OTHER PUBLICATIONS

Juliana s, Malta; Mar. 26, 2007-Mar. 2007, Mar. 22, 2007, XP050602966, [retrieved on Mar. 22, 2007].
Qualcomm Incorporated: "TCP Performance Evaluation of SF-DC Inter NodeB Aggregation Assuming Realistic RLC, Flow Control and Iub Congestions Control", 3GPP Draft; R1-112686_TCP_PERF_EVAL_SF_DC_INTER_NODEB_REALISTIC_RLC_FC_CC, 3rd Generation Partnership Project (3GPP), Mobi le Competence Centre; 650, Route Des Lucioles; F-06921 Sophia-Antipolis Cedex ; France, vol. RAN WG1, no. Athens, Greece; Aug. 22, 2011, Aug. 16, 2011, XP050537724, [retrieved on Aug. 16, 2011].
Sandrasegaran K., et al., "Delay-Prioritized Scheduling (DPS) for Real Time Traffic in 3GPP LTE System", IEEE Wireless Communications and Networking Conference (WCNC), pp. 1-6, 2010.
QUALCOMM Incorporated, "Further details and benefits of deploying DC-HSDPA UEs in Single Frequency Networks", 3GPP TSG RAN WG1 Meeting #62, R1-104738, Aug. 2010, 12 pages, URL, http://www.3gpp.org/ftp/tsg_ran/wg1_rl1/TSGR1_62/Docs/R1-104738.zip.

\* cited by examiner

METHOD AND APPARATUS FOR FLOW CONGESTION CONTROL IN MULTIFLOW NETWORKS

CLAIM OF PRIORITY UNDER 35 U.S.C. §119

The present Application for Patent claims priority to Provisional Application No. 61/514,858 entitled "Flow Control and Congestion Control for Multi-Point HSDPA" filed Aug. 3, 2011, and assigned to the assignee hereof and hereby expressly incorporated by reference herein. In addition, the present Application claims priority to Provisional Application No. 61/522,178 entitled "Flow Control and Congestion Control for Multi-Point WSDPA" filed Aug. 10, 2011, and assigned to the assignee hereof and hereby expressly incorporated by reference herein.

BACKGROUND

1. Field

Aspects of the present disclosure relate generally to wireless communication systems, and more particularly, to improving congestion in communication links between NodeBs and radio network controllers.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

A further wireless communication protocol based on UMTS is High Speed Downlink Packet Access (HSDPA). In some HSDPA communication networks, a user equipment (UE) is served by two different cells or NodeBs. Such a system may be referred to as a multiflow, Dual-Cell HSDPA or Dual-Carrier HSDPA, or DC-HSDPA system. DC-HSDPA provides joint scheduling across two HSDPA carriers to increase the peak data rates per user and better utilize the available resources. An extension of DC-HSDPA is Single-Frequency Dual-Cell HSDPA (SF-DC), where SF-DC replaces the two carriers in DC-HSDPA by two cells in the same carrier. In a system with SF-DC, if a UE is in softer or soft handover, it will be served by both the primary serving cell (which has the strongest pilot Ec/Io), and the secondary serving cell (which has the second strongest pilot Ec/Io).

In HSDPA, the control of radio frame scheduling, e.g. flow control, is moved from a radio network controller (RNC) to the NodeBs. Typical flow control algorithms assume that the backhaul link, referred to as the Iub link, has unlimited capacity—however, this is not always the case. When the Iub link does not have unlimited capacity, then congestion occurs and the Iub link becomes a bottleneck in the flow control process. Such bottlenecking leads to poor network downlink performance and a corresponding degraded user experience.

As the demand for mobile broadband access continues to increase, research and development continue to advance the UMTS technologies not only to meet the growing demand for mobile broadband access, but to advance and enhance the user experience with mobile communications. Thus, an improved method and apparatus for limiting Iub link congestion in a multiflow environment is needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides methods and apparatuses for improved Iub link congestion management based on a dynamic scaling of flow control request message transmission in multiflow wireless environments. For example, in an aspect, methods and apparatuses are provided for receiving, at a NodeB, a data request from one or more user equipment (UE), wherein each data request corresponds to a flow and the one or more UE is served by a plurality of NodeBs, generating a flow control request corresponding to each flow in response to each data request, and sending each flow control request to a radio network controller (RNC). Thereafter, a Node B may receive data in response to each flow control request, determine a congestion state based on the received data, and scale a subsequent one or more flow control requests based on the determined congestion state.

Additionally, the present disclosure presents an apparatus for improved management of Iub link congestion that includes means for receiving, at a NodeB, a data request from one or more user equipment, and where each data request corresponds to a flow and the one or more UE is served by a plurality of NodeBs. The disclosure further contemplates the apparatus including means for generating a flow control request corresponding to each flow in response to each data request, means for sending each flow control request to a radio network controller, means for receiving data in response to each flow control request, means for determining a congestion state based on the received data, and means for scaling a subsequent one or more flow control requests based on the determined congestion state.

In an further aspect, the present disclosure presents a computer program product that includes a computer-readable medium containing code for receiving, at a NodeB, a data request from one or more user equipment, wherein each data request corresponds to a flow and the one or more UE is served by a plurality of NodeBs, code for generating a flow control request corresponding to each flow in response to each data request, code for sending each flow control request to a radio network controller; code for receiving data in response to each flow control request, code for determining a congestion state based on the received data, and code for scaling a subsequent one or more flow control requests based on the determined congestion state.

Additionally presented herein is an apparatus for wireless communication, which includes at least one processor and a memory coupled to the at least one processor, where the at least one processor is configured to receive, at a NodeB, a data request from one or more user equipment, wherein each data request corresponds to a flow and the one or more UE is served by a plurality of NodeBs, configured to generate a flow control request corresponding to each flow in response to each data request, send each flow control request to a radio network controller, receive data in response to each flow control request, determine a congestion state based on the received data, and scale a subsequent one or more flow control requests based on the determined congestion state.

Moreover, the present disclosure presents a method of data control in a multilink downlink network that includes receiving, at a radio network controller, a flow control request from one or more NodeBs, wherein each flow control request corresponds to a flow with a user equipment and the flow is served by a plurality of NodeBs, sending data to each NodeB in response to each flow control request, and receiving a scaled one or more flow control requests based on a determined congestion state in response to sending the data.

Further contemplated herein is an apparatus for wireless communication that includes means for receiving, at a radio network controller, a flow control request from one or more NodeBs, wherein each flow control request corresponds to a flow with a user equipment and the flow is served by a plurality of NodeBs, means for sending data to each NodeB in response to each flow control request, and means for receiving a scaled one or more flow control requests based on a determined congestion state in response to sending the data.

Additionally presented herein is a computer program product that includes a computer-readable medium comprising code for receiving, at a radio network controller (RNC), a flow control request from one or more NodeBs, wherein each flow control request corresponds to a flow with a user equipment and the flow is served by a plurality of NodeBs, code for sending data to each NodeB in response to each flow control request, and code for receiving a scaled one or more flow control requests based on a determined congestion state in response to sending the data.

In addition, the present disclosure presents an apparatus for wireless communication, which includes at least one processor and a memory coupled to the at least one processor, and where the at least one processor is configured to receive, at a radio network controller, a flow control request from one or more NodeBs, wherein each flow control request corresponds to a flow with a user equipment and the flow is served by a plurality of NodeBs. The at least one processor may further be configured to send data to each NodeB in response to each flow control request and receive a scaled one or more flow control requests based on a determined congestion state in response to sending the data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
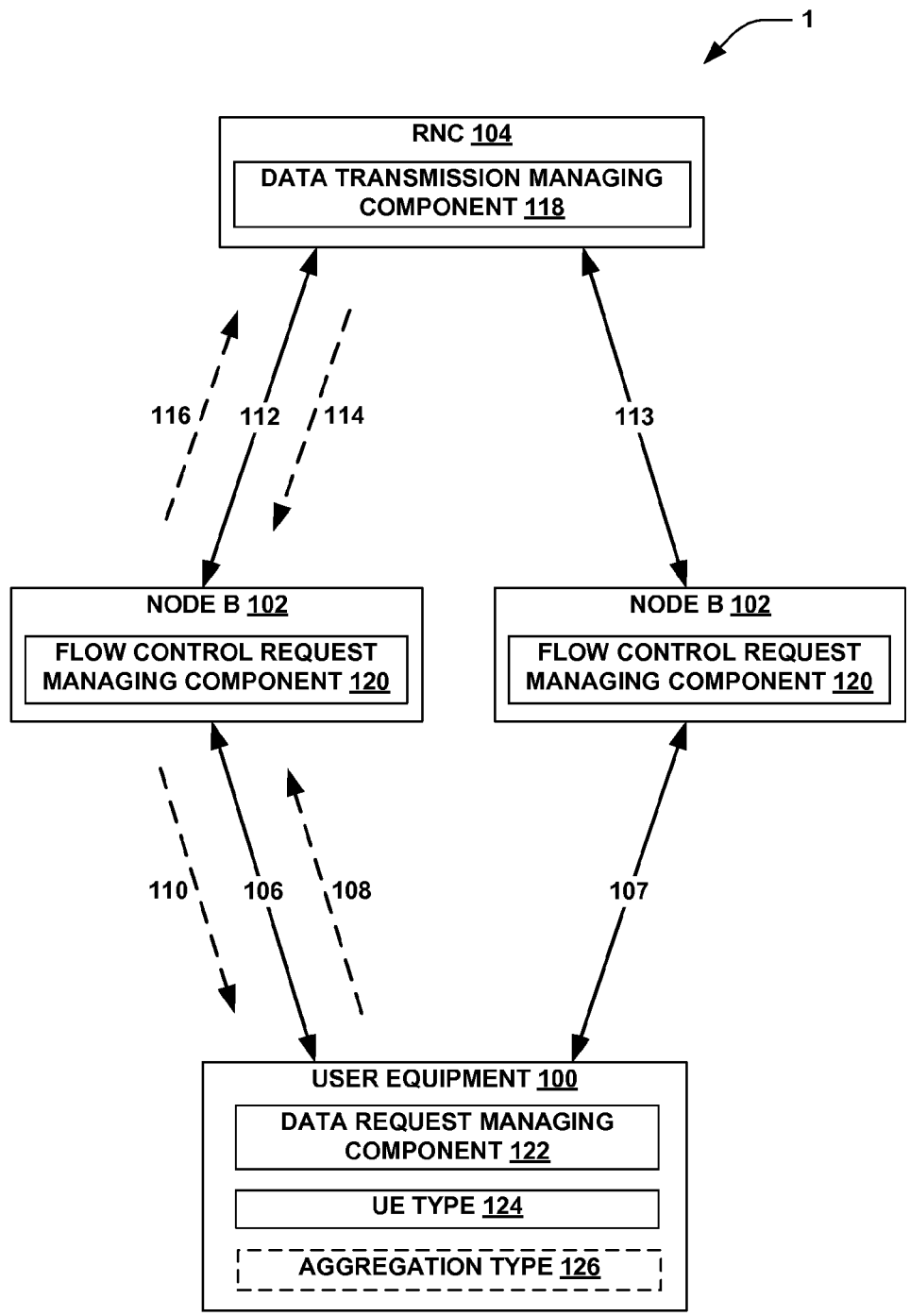
FIG. 1 is a block diagram illustrating an example multiflow wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides methods and apparatuses for reducing Iub link congestion in multiflow wireless environments. In an aspect of the present disclosure, apparatuses and methods may include a NodeB-centric method of implementing flow control that takes into account congestion in the communication link between one or more NodeBs and a radio network controller (RNC). Specifically, the described apparatuses and methods may enable a NodeB to scale flow control requests, sent to an RNC based on a measured state of congestion in the Iub link, which may be representative of an existing Iub link capacity being less than a known (or assumed or estimated) Iub link capacity.

In particular, according to the present disclosure, each flow control request may be responsive to a data request, which may also be referred to as a capacity allocation message, for a specific flow corresponding to a UE being served in part by the respective NodeB. Optionally, the described apparatus and methods may additionally scale the flow control requests based on a scheme that prioritizes primary UEs over secondary UEs. As described herein, a primary UE may include legacy UEs and SF-DC UEs that have a given cell as their primary serving cell, while a secondary UE includes SF-DC UEs that have the given cell as their secondary serving cell. The operation of the described aspects may result in minimizing the impact from SF-DC on non-SF-DC UEs, which may include legacy UEs and/or SF-DC capable UEs not in a soft handoff (SHO) region.

In one aspect, for example, the apparatus and method include the NodeB receiving a data request from one or more user equipment (UE), wherein each data request corresponds to a flow. The NodeB may then generate a flow control request corresponding to each flow in response to each data request, and may send each flow control request to an RNC. Subsequently, the NodeB may receive data in response to each flow control request and may determine a congestion state based, in one aspect, on a downlink delay from the RNC detected in the received data. As a result of the congestion state of the link with the RNC, the NodeB may scale a subsequent one or more flow control requests based on the determined congestion state.

In some aspects, the scaling of the subsequent one or more flow control requests may include, for example, reducing the subsequent one or more flow control requests when the congestion state represents a reduction in an Iub link capacity associated with the Iub link. In other words, a requested capacity in the flow control request may be reduced to help reduce the congestion. In a non-limiting example of the present disclosure, the reduction may be based on a congestion factor. Moreover, the reducing may be performed on a per-flow basis.

In another non-limiting aspect, the congestion is determined based on measuring a delay in receiving data packets from the RNC. Specifically, the RNC may timestamp the data packets, and the described apparatus and methods may further include determining, for each incoming packet of the received data, a downlink delay value, for example, based on the timestamp, incrementing a counter of congested packets when the downlink delay value is greater than a delay threshold, and identifying the existence of congestion when the counter is greater than a congestion threshold. In particular, the described apparatus and methods may perform the above-described delay measurement each flow control cycle, which corresponds to a period of sending of each flow control request to the RNC. In an optional additional aspect, as noted above, the described apparatus and methods may also scale the flow control requests based on a scheme that prioritizes primary UEs over secondary UEs based on how the capacity for data requests compares to the available Iub link capacity of the Iub link between the NodeB and the RNC.

Furthermore, in some examples, where the capacity of data requests for primary UEs is less than the available Iub link capacity, then the described apparatuses and methods may determine a remaining Iub link capacity after distributing a portion of the Iub link capacity for all flow control requests corresponding to the primary UEs, and distribute the remaining Iub link capacity for each flow control request corresponding to each secondary UE in proportion to a requested capacity for each data request corresponding to each secondary UE.

In other aspects, the NodeB may adjust flow control requests of UEs based on factors related to the communication between the NodeB and the UEs. For example, in one aspect, the generating of each flow control request corresponding to each flow may be based on an estimated flow throughput and a target queuing delay of the respective flow. The estimated flow throughput may correspond to the actual throughput over the physical interface, and may be the data rate seen by a UE. Furthermore, the queuing delay may be the delay in a NodeB queue, which may be defined as the duration from a time data arrives at the NodeB queue to a time the data is sent over the physical interface.

In an additional aspect, the generating of each flow control request corresponding to each flow may be adapted based on cell loading. In one example, when a cell of a primary UE has a loading above a loading threshold, e.g. 40% in one use case, then the NodeB may generate the flow control requests for the primary UEs but stop generating the flow control requests for the secondary UEs in the cell until the loading is reduced. In other exemplary aspects, the NodeB may adjust the scheduling of data to be served to the UEs based on factors related to the communication between the NodeB and the UEs, and/or based on primary and secondary UEs. For example, in one aspect, the NodeB may prioritize primary UEs over secondary UEs when scheduling the serving of data to the UEs. Moreover, during heavy loading periods, the NodeB may prioritize the primary UEs and the secondary UEs having inter-NodeB aggregation over the secondary UEs having intra-NodeB aggregation. In addition, there exist two flavors of Single Frequency Dual-Carrier (SF-DC) Aggregation: Intra-NodeB Aggregation where the two serving cells reside in the same Node B and Inter-NodeB SF-DC Aggregation where the two serving cells reside in different Node Bs.

The present disclosure also contemplates an RNC for performing methods described herein for controlling congestion on the Iub link. For example, the apparatuses and methods of the present disclosure include an RNC receiving a flow control request from one or more NodeBs, wherein each flow control request may correspond to a flow with a user equipment (UE). Furthermore, the RNC may send data to each NodeB in response to each flow control request, and may receive a scaled one or more flow control requests based on a congestion state determined by a respective NodeB in response to receiving the sent data.

As noted above, the RNC may send portions of the requested data to the NodeB in a data sending cycle, which may be represented by $T_{checking}$, that is shorter than a flow control request cycle, which may be represented by $T_{fc}$. An amount of data in each portion sent to the NodeB may be an amount up to $Ri*(T_{checking}/T_{fc})$, where Ri is a requested data amount from the flow control request.

Further, in an aspect, if the RNC does not have enough available data enough data to fulfill all flow control requests, then RNC may split the available data amount in proportion with the requests. Also, in some prior art techniques, the lack of available data would define a deficit amount that may be credited (e.g. for future flow control requests). The RNC of the present aspects, however, may discard any credit corresponding to the deficit amount.

In a further aspect, the RNC may provide a temporary higher priority for a flow control request, such as when a new primary UE arrives. Specifically, where the RNC receives a flow control request corresponding to a first primary UE, a first flow control request from a secondary UE, and an initial flow control request from a second primary UE in a same cell as the secondary UE (which may be received subsequent to receiving the flow control request from the secondary UE), then the RNC may send data to the second primary UE in response to the initial flow control request after sending data to the secondary UE in response to the first flow control message. In addition, the RNC may reduce data sent to the secondary UE in response to a second flow control subsequent to the initial flow control request received from a second primary UE.

FIG. 1 illustrates an exemplary multilink wireless communication system 1 that facilitates improved Iub link congestion control. System 1 includes one or more user equipment (UE) 100 that may communicate with one or more NodeBs 102 via one or more over-the-air links 106 and 107 to receive data wirelessly via flows 106 and/or 107. NodeBs 102 may be for example, a Node B such as used in Universal Mobile Telecommunications System (UMTS) networks. Although the term NodeB is used in the current description it should be understood that in aspects the NodeB entity may be, for example, a base transceiver station (BTS), base station, or Evolved NodeB (ENodeB).

In an aspect, flows 106 and/or 107 may carry a downlink flow 110 of data originating from a radio network controller (RNC) 104 and routed to UE 100 by a NodeB 102. Furthermore, as system 1 may represent a multiflow wireless system, UE 100 may be served by a plurality of NodeBs 102 and may therefore receive data via both flow 106 and 107. Additionally, flows 106 and 107 may transmit portions of the same data message to UE 100. For example, RNC 11 may generate and/or receive a message comprised of one or more larger data packets (e.g., service data units (SDUs)) and deconstruct the one or more larger data packets into one or more smaller data packets (e.g., protocol data units (PDUs)). In an aspect of multiflow wireless system 1, one or more of these smaller data packets may be transmitted to UE 100 via flow 106 while one or more of the smaller data packets may be transmitted to UE 100 via flow 107. Additionally, regardless of the data path traversed by the smaller data packets, the UE 100 may reconstruct the original message.

The UE 100 of system 1 may be configured to request data from a network component, such as, but not limited to, NodeB 102, by generating and transmitting one or more data requests 108 to NodeB 102. Furthermore, UE 100 may be configured to receive data from a network (e.g., NodeBs 102 and/or RNC 104) via multiple flows, such as flows 106 and 107. In a further aspect of the present disclosure, UE 100 may include a data request managing component 122, which may be configured to generate and transmit one or more data requests 108 to one or more NodeBs 102.

Although not illustrated, NodeBs 102 may provide wireless coverage over one or more cells as is common in cellular systems, such as in UMTS. For simplicity in explanation, in the below discussed examples it is assumed that each NodeB 102 provides wireless coverage for a single cell. However, it should be understood that in actual implementation, each NodeB 102 may provide coverage over one or more cells depending on the specifics of the network implementation.

Furthermore, UE 100 may have one or more associated UE types 124, which may be, in a non-limiting example, a primary UE type and/or a secondary UE type. As described herein, a primary UE type may specify that the UE is a legacy UEs or a Single-Frequency Dual-Cell HSDPA (SF-DC) UE that has a given cell as their primary serving cell. The secondary UE type may be used to specify that the UE is a SF-DC UE that has the given cell as their secondary serving cell. Because, as noted above, UE 100 may be a multiflow-enabled UE that is connected to more than one NodeB 102 (e.g., a NodeB providing the UE's primary cell and a NodeB providing the UE's secondary cell), the UE may have varying UE types 124. For example, where a first cell is a primary serving cell for a UE 100 and a second cell is a secondary serving cell for the UE 100, the UE 100 may store a UE type 124 that includes two values—a primary UE value for the primary cell and a secondary UE value for the secondary cell. As will be discussed in further detail below, UE 100 may comprise hardware and/or software for implementing the illustrated data request managing component 122 and storing information (e.g., UE type 124).

Although referred to as NodeBs 102 in the illustrated example, according to an additional aspect, the one or more NodeBs 102 of system 1 may be or include, for example, one or more of any type of network component, such as an access point, including a base station (BS) or node B, a relay, a peer-to-peer device, an authentication, authorization and accounting (AAA) server, a mobile switching center (MSC), etc., that can enable UE 100 to communicate and/or that can establish and maintain data flows 106 and/or 107. In addition, in system 1, the one or more NodeBs may be in communicative contact with RNC 104 via one or more communication links, such as Iub links 112 and/or 113. In a further aspect, Iub link 112 associated with a NodeB 102 may carry data packets 114 transmitted by RNC for a destination UE 100 that NodeB 102 may route to UE 100 via a downlink flow 110 in link 106.

Furthermore, in the illustrated example, each of the one or more NodeBs 102 of system 1 may include a flow control request managing component 120, which may be configured to generate and transmit one or more flow control requests 116 to RNC 104. In an aspect, flow control request managing component 120 may obtain and process one or more data requests 108 sent from UE 100 and generate the one or more flow control requests 116 based upon the one or more data requests 108 and a congestion state associated with Iub link 112. As such, NodeB may scale transmission of flow control requests 116 according to at least the congestion state associated with Iub link 112. As will be discussed in further detail below, such as, for example, with reference to FIGS. 4 and 8, Node B 102 may comprise hardware and/or software for implementing the illustrated flow control request managing component 120 and storing information (e.g., the congestion state), In addition, RNC 104 may include a data transmission managing component 118, which may be configured to manage the generation and transmission of one or more data packets 114 to one or more NodeBs 102. The data transmission component 118 may generate data packets 114 based on one or more scaled flow control requests 116 received from one or more NodeBs 102. Transmitting these one or more data packets according to the scaled flow control requests 116, which as noted above are based on the congestion state of the Iub link (e.g., 112 and/or 113) in the illustrated example, may lower the transmission rate of data on the Iub. The embodiment of the illustrated example may thus be used to reduce Iub link congestion and accordingly improve the user experience.

Figure 2:
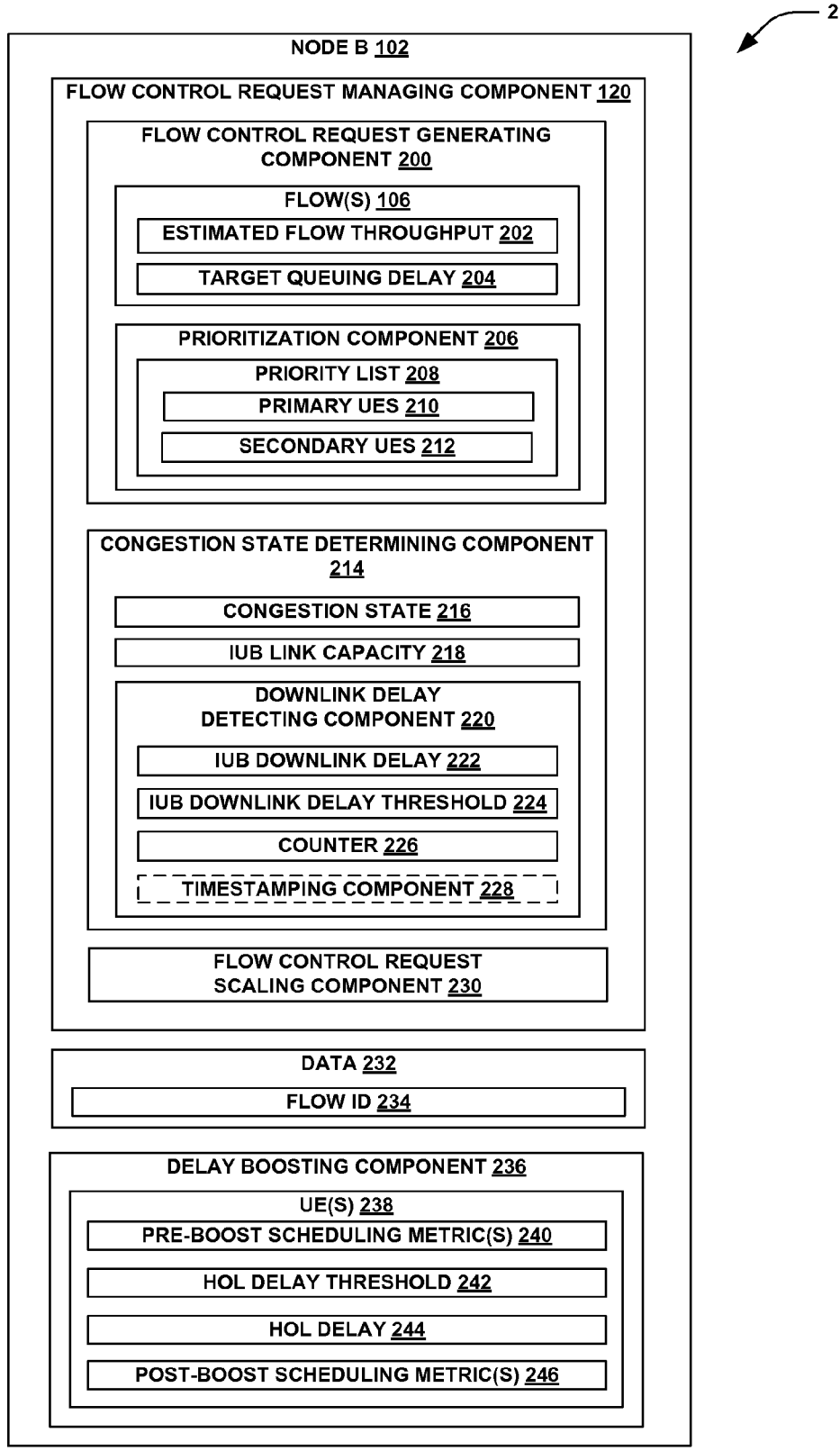
FIG. 2 is a block diagram illustrating an example of a NodeB in aspects of the present disclosure.

FIG. 2 illustrates an exemplary configuration for NodeB 102 of FIG. 1, for improving congestions conditions on an Iub link. As noted above, NodeB 102 may be configured to receive data from an RNC in response to one or more flow control requests and may forward this data to one or more UEs via one or more flows. As noted above, NodeB 102 may include a flow control request managing component 120, which may be configured to generate and transmit these one or more flow control requests to an RNC over, for example, an Iub link (e.g., link 112) between NodeB 102 and the RNC.

Flow control request managing component 120 may contain several components to carry out the operations associated with, for example, generating and/or transmitting one or more flow control requests (e.g. flow control request 116 of FIG. 1). Flow control request managing component 120 may include, for example, a flow control request generating component 200, which may generate one or more flow control requests. In an aspect, flow control request generating component may generate a flow control request, which may also be referred to as a capacity allocation message, in response to receiving a data request from a UE being served in part by the NodeB 102 via a flow 106. Furthermore, each data request and/or flow control request may correspond to a specific flow 106 associated with the UE. Additionally, because NodeB 102 may serve a plurality of UEs via a plurality of flows, NodeB 102 may store a list of flows 106. For each flow, NodeB may store information pertinent to each flow 106, such as, but not limited to, an estimated flow throughput 202 and a target queuing delay 204. A further explanation of the estimated flow throughput 202 and target queuing delay 204 are provided below.

As illustrated, flow control request generating component 200 may include a prioritization component 206, which may be configured to prioritize one or more UEs that are served by NodeB 102. This UE prioritization may be utilized when, for example, limited Iub resources are available due to Iub congestion. Where such congestion is present, NodeB may utilize a stored priority list 208 to determine the order in which the RNC should transmit data to NodeB 102, and therefore the order in which the NodeB should transmit flow control requests to the RNC. In some aspects of the present disclosure, priority list 210 may prioritize UEs according to their UE type, such as assigning a higher priority to primary UEs 210 than to secondary UEs 212.

NodeB 102 may also include a congestion state determining component 214 for determining a congestion state 216 associated with an Iub link between NodeB 102 and an RNC. Congestion state determining component 214 may determine, store, and/or monitor an Iub link capacity 218 associated with the Iub. Congestion state determining component 214 may utilize this Iub link capacity 218 to determine congestion state 218. For example, congestion state determining component 214 may measure a current congestion level of the Iub and determine whether the Iub is in a congested state by comparing the current congestion level to Iub link capacity 218.

In an additional or alternative aspect, congestion state determining component 214 may determine whether NodeB 102 shares its Iub link with one or more other NodeBs. Where the Iub is shared, the data capacity per NodeB may not be fixed because transmission of more data related to a first NodeB may be increased when data communication related to a second NodeB falls below its per NodeB capacity. Where the Iub is shared between NodeBs, the true data capacity for a NodeB (e.g. NodeB 102) can be estimated by performing a test to determine the maximum data rate, such as, for example, at a given time before congestion occurs. Furthermore, NodeB 102 may be configured to test for instances of data loss on the Iub. Where such data loss is detected, NodeB 102 may determine that the Iub is in a congested state. As a result, in an aspect, NodeB 102 may make further reduce the flow control request transmission rate.

Congestion state determining component 214 may further include a downlink delay detecting component 220, which may be configured to determine an Iub downlink delay 222 associated with the Iub downlink data packet transmissions from the RNC. In an aspect, downlink delay detecting component 220 may store an Iub downlink delay threshold 224 associated with the Iub link. Upon receipt of a data packet from the RNC, downlink delay detecting component may compare the Iub downlink delay 222 experienced by the data packet to Iub downlink delay threshold 224. In some examples, downlink delay detecting component 220 may include a timestamping component 228, which may timestamp a flow control request transmitted from NodeB 102 to the RNC. Thereafter, timestamping component 228 may timestamp a received data packet corresponding to the transmitted flow control request and may deem the difference of the transmission and receipt timestamps as the Iub downlink delay. Alternatively or additionally, the RNC may also include a timestamping component and may timestamp a data packet at transmission to NodeB 102, and downlink delay detecting component 220 may deem the difference between this RNC transmission timestamp and the subsequent NodeB receipt timestamp as the Iub downlink delay 222. In an aspect, where the Iub downlink delay 222 determined from a determined timestamp difference exceeds Iub downlink delay threshold 224, downlink delay detecting component 220 may increment a counter 224. In a further aspect, where a value associated with counter 226 exceeds a preconfigured or otherwise obtained counter congestion threshold value, downlink delay detecting component 220 may determine that the Iub is in a congested state.

Flow control request managing component 120 may also include a flow control request scaling component 230, which may be configured to scale the transmission of flow control requests to an RNC upon, for example, a determination that the Iub link is in a congested state. In an aspect, flow control request scaling component 230 may be configured to scale these transmissions by lowering a flow control request transmission frequency.

Additionally, in an aspect, NodeB 102 may be configured to receive, queue, otherwise store, and/or transmit data 232 received from the RNC via the Iub link in response to one or more previously-transmitted flow control requests. Furthermore, data 232 may include an associated flow identification (ID) 234 that may indicate to which flow NodeB 102 should forward data 232.

Furthermore, NodeB 102 may include a delay boosting component 236, which may be configured to identify and store one or more delays associated with data destined for one or more UEs 238. The delays may be, for example, identified and stored for each UE 238 connected to the Node B 102. The stored delays may be used by the Node B to expedite the transmission of data where the delay, such as a head of line (HOL) delay 244, exceeds a threshold, such as HOL delay threshold 242. In legacy NodeB schedule management methods, a schedule may assign each UE served by the NodeB with a scheduling metric and may sort the metrics for all of the UEs once the schedule metrics are assigned. Thereafter, the NodeB may choose the UE with the largest scheduling metric and transmit data to that UE.

Additionally, in traditional scheduling at a NodeB, the scheduling metric $S_{legacy}$ for each $UE_i$, is determined by the equation:

$$S_{legacy} = \alpha_i R_{req,i} / R_{served,i}$$

where $R_{req,i}$ is the requested throughput of $UE_i$ and $R_{served,i}$ is the served throughput of $UE_i$, and $$\alpha_i \begin{cases} = 1 & \text{where } UE_i \text{ is secondary} \\ > 1 & \text{where } UE_i \text{ is primary} \end{cases}$$

In some aspects of the present disclosure, delay boosting component 236 may compute and store a pre-boost scheduling metric 240 for one or more of UEs 238, where pre-boost scheduling metric 240 may be, but is not limited to being, computed according to the legacy methods outlined above. In some aspects, however, delay boosting component 236 may boost a pre-boost scheduling metric 240 to a post-boost scheduling metric 246 for one or more UEs 238 based on the relation of an HOL delay 244 to a HOL delay threshold 242.

Specifically, NodeB 102 may compute a packet delay associated with each of one or more data packets (e.g. data 232), where the packet delay associated with each packet may be defined as the interval between the time the packet enters a NodeB receive buffer and the time the packet is transmitted to the UE 238. In a further aspect, HOL delay 244 associated with each UE 238 may be computed by delay boosting component 236 by determining the largest packet delay among all of the packets associated with a particular UE 238. Once the HOL delay 244 is defined for each UE 238 served by NodeB 102, delay boosting component 236 may compare this HOL delay 244 to an HOL delay threshold 242. In an aspect, where the HOL delay 244 associated with a UE 238 is larger than the HOL delay threshold 242 value, delay boosting component 236 may boost the scheduling metric associated with the UE 238, such as the pre-boost scheduling metric 240. In an additional aspect, HOL delay threshold 242 may be preconfigured by a user, manufacturer, or network or otherwise static, or may be dynamic based on, for example, current network parameters. In some aspects, HOL delay threshold 242 may initially have a value of approximately 350 ms, though any delay threshold value may be configured.

In some examples, delay boosting component 236 may effectuate boosting, or expediting, the delay state of a UE by altering the pre-boost scheduling metric 240, and in turn by adjusting the $\alpha_i$ parameter, to generate the post-boost scheduling metric 246 associated with each UE 238. For example, in an optional aspect, delay boosting component 236 may double the $\alpha_i$ associated with a UE 238 where the HOL delay 244 corresponding to the UE 238 equals or exceeds the HOL delay threshold 242. Therefore, in some aspects, the following algorithm may govern the behavior of delay boosting component 236 in adjusting the pre-boost scheduling metric 240 to the post-boost scheduling metric 246:

$$\alpha_i = \begin{cases} \alpha_i, & \text{where } HOL \text{ delay} < HOL \text{ delay threshold} \\ 2\alpha_i, & \text{where } HOL \text{ delay} \geq HOL \text{ delay threshold} \\ 4\alpha_i, & \text{where } HOL \text{ delay} \geq 2(HOL \text{ delay threshold}) \\ 8\alpha_i, & \text{where } HOL \text{ delay} \geq 4(HOL \text{ delay threshold}) \end{cases}$$

As such, transmission of delayed data packets may be expedited to help ensure a positive user experience for a maximum number of UE users served by NodeB 102.

Figure 3:
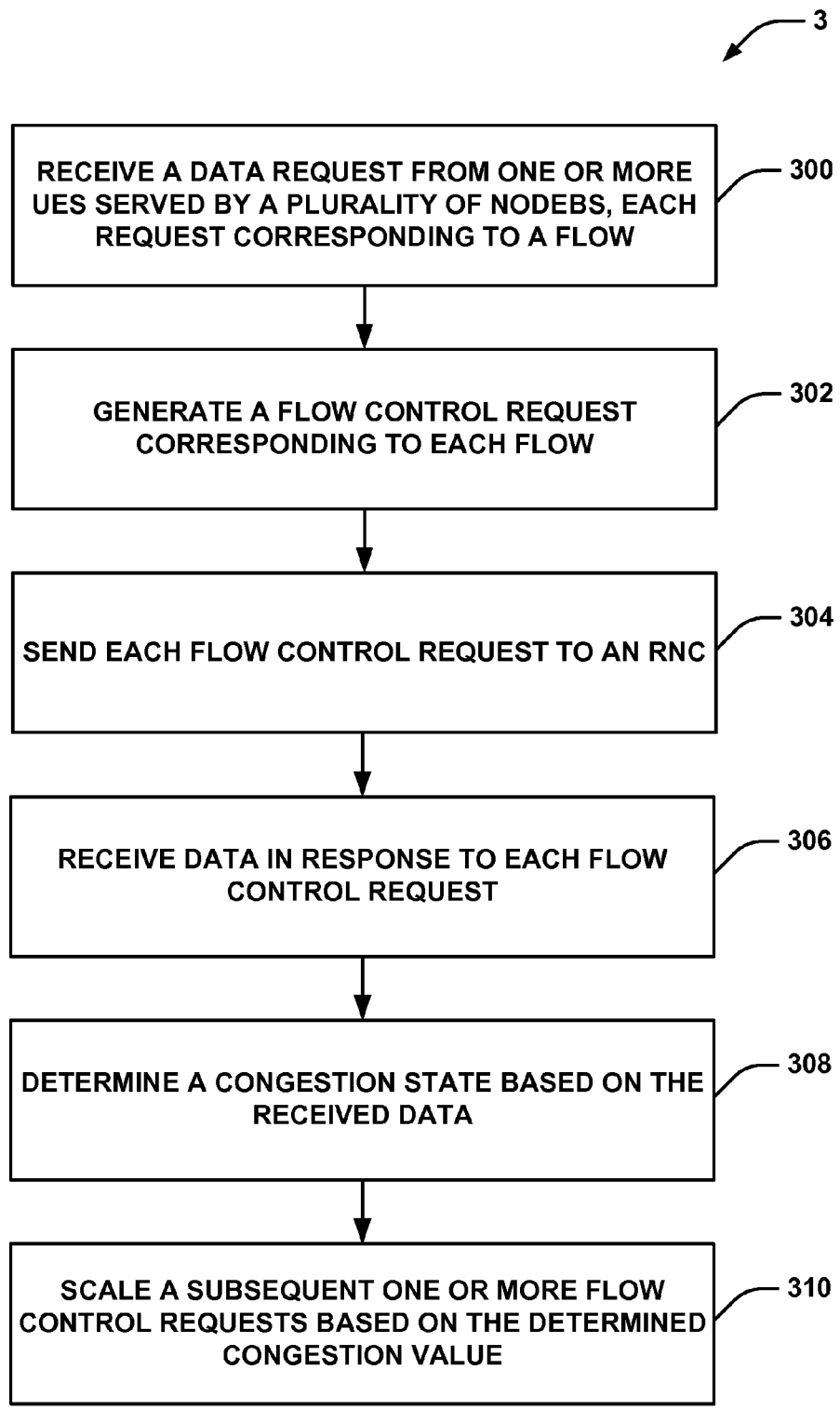
FIG. 3 is a flow diagram illustrating aspects of a method for supporting improved Iub link congestion control in a multilink wireless environment as provided by the present disclosure.

FIG. 3 illustrates an example methodology for improving Iub congestion in wireless network environments. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In an aspect, at block 300, a NodeB (e.g. any of NodeBs 102, FIGS. 1 and 2) may receive one or more data requests from one or more UEs. In an aspect, each of the one or more UEs may be served or may be configured to be served by a plurality of Node Bs so as to constitute a multiflow-capable UE. Furthermore, in an aspect, each of the one or more data requests may correspond to a particular flow between a NodeB and a UE. As illustrated, at block 302, the NodeB may generate a flow control request corresponding to each flow in response to each data request received from the one or more UEs. In one aspect of the present disclosure, each flow control request may be generated based on an estimated flow throughput associated with the Iub link and/or a target queuing delay for the flow associated with the flow control request. In an aspect, the estimated flow throughput and/or the target queuing delay may be preconfigured values. In another aspect, these values may be dynamically generated based on one or more current or past network and/or UE conditions.

In a further aspect, receiving one or more data requests at block 300 and/or generating each flow control request at block 302 may include receiving a first data request from a primary UE and a second data request from a secondary UE, and further comprising prioritizing the primary UE over the secondary UE for generating a corresponding flow control request and transmitting data (e.g., data received from an RNC) to the UE(s).

Additionally, this or other prioritization schemes may be based on the Iub link capacity or other network and/or UE parameters. In an example aspect, receiving the data requests at block 300 may include receiving an associated capacity request, which may be explicit or simply inherent to the amount of data requested by the UE via a flow. Additionally, the NodeB may obtain a UE type associated with the requesting UE(s), which may aid in prioritization algorithms contemplated by the present disclosure. For example, in one aspect, the UE may obtain or compute a sum of requested capacities from all primary UEs. In some instances, this sum of all primary UEs may be greater than or equal to a stored or computed Iub link capacity of the Iub link between the NodeB and the RNC. In such a scenario or other non-limiting examples, the NodeB may distribute the Iub link capacity across all the primary UE-related flow control requests in proportion to the requested capacity of each primary UE flow control request relative to a sum of all requested capacities in all data requests corresponding to primary UEs.

In a further aspect, generating the flow control request corresponding to each flow may include generating the flow control requests only for flows related to primary UEs and ignoring data requests from any secondary UEs. In an alternative aspect, a NodeB may determine a remaining Iub link capacity after distributing a portion of the Iub link capacity for all flow control requests corresponding to the primary UEs. Thereafter, the NodeB may distribute the remaining Iub link capacity for each secondary UE-related flow control request, and may do so, in a non-limiting example, in proportion to the requested capacity for each data request corresponding to each secondary UE.

Moreover, one or more UE prioritization algorithms may utilize loading conditions in one or more cells served by one or more NodeBs in a wireless network environment. For example, in some examples, a NodeB may receive a first data request from a primary UE and a second data request from a secondary UE and may further determine that a loading exceeds a loading threshold in a cell of the primary UE. Based at least on this determination, the NodeB may prioritize the primary UE over the secondary UE and may thus generate one or more flow control requests only for the primary UE(s).

In other prioritization aspects of the present disclosure, a NodeB may prioritize UEs for flow control message generation based at least upon the aggregation properties of one or more requesting UEs. In one non-limiting aspect, for example, receiving one or more data requests may include receiving a first data request from a primary UE, a second data request from a secondary UE having inter-NodeB aggregation, and a third data request from a secondary UE having intra-NodeB aggregation. Based on these requests, the Node B may determine that a loading needed to execute the first data request exceeds a loading threshold in a cell of the primary UE. As a result, the NodeB may, for example, prioritize one secondary UE over the other secondary UE. For example, the Node B may prioritize the primary UE and the secondary UE having inter-NodeB aggregation over the secondary UE having intra-NodeB aggregation for serving the received data. Alternatively, in an aspect, the NodeB may prioritize the primary UE and the secondary UE having intra-NodeB aggregation over the secondary UE having inter-NodeB aggregation for serving the received data. As such, the available Iub link resources may be prioritized at one or more NodeBs to deliver an optimized user experience in a wireless network.

In an additional aspect, at block 304, a NodeB may send each flow control request to an RNC, for example, via an uplink in an Iub link. In an aspect, the NodeB may send flow control requests periodically, and may base the periodic flow control request transmission on, for example, a flow control cycle, which may be represented herein as $T_{fc}$. Furthermore, at block 306, the NodeB may receive data in response to the one or more flow control requests sent by the NodeB, for example, at block 304. In an aspect, this data may be received in portions. For example, the data may be received in a plurality of messages transmitted by the RNC (e.g. data packets and/or PDUs). Furthermore, receiving the data in portions may include receiving one or more of the portions once each data serving cycle, which may be represented as $T_{checking}$. Furthermore, in a non-limiting example, the amount of the portion of data received by the NodeB may be $R_i \times (T_{checking}/T_{fc})$, where $R_i$ may represent a requested data amount included in a flow control request.

In an additional aspect of example methodology 3, based on at least a downlink delay from the RNC detected in the received data from the RNC at, for example, block 306, the NodeB may determine a congestion state associated with the Iub link. By non-limiting example, the congestion state may be one of a congested and not congested state, though other, intermediate states may exist. In an additional aspect, the congestion state may be determined intermittently and/or during each flow control cycle.

Furthermore, to determine the congestion state associated with the Iub link, the NodeB may determine a downlink delay value associated with each incoming packet of received data from the RNC. Such a delay value may be obtained by the NodeB, for example, by timestamping each received data packet upon arrival at the NodeB. This timestamp, in an aspect, may be compared to a previous timestamp associated with the data. In some non-limiting examples, this previous timestamp may be associated with a time of transmission from the RNC and/or a timestamp of the NodeB transmission of the flow control request transmission associated with the data. The NodeB may compare the previous timestamp and the timestamp associated with the NodeB receipt of the data from the RNC to determine whether the difference between the timestamp times is less than, equal to, or greater than a delay threshold. This delay threshold, in some non-limiting examples, may be preconfigured and/or set by the network, UE, or a user during UE use, or may be dynamically configured based on one or more network or UE conditions. In an aspect, where the difference in the timestamps is greater than (or equal to) the delay threshold, the NodeB may determine that the Iub is in a congested state, whereas where the difference in timestamps is less than (or equal to) the delay threshold, the NodeB may determine that the Iub is in a not congested state. In an additional or alternative aspect, the NodeB may increment a counter of congested packets where a delay value associated with a received packet is greater than the delay threshold. Where the counter value equals or surpasses a congestion threshold value, the NodeB may identify the Iub as being in a congested state. In a further aspect, the NodeB may determine the congestion state on a per flow basis. By non-limiting example, there may exist a counter at the NodeB associated with each flow originating from the NodeB.

At block 310, a NodeB may scale a subsequent one or more flow control requests based on the determined congestion state. For example, in some aspects, the NodeB may decrease the rate of flow control request generation and/or transmission based on the determined congestion state, such as where the Iub is determined to be in a congested state or where the congestion state otherwise represents a reduction in the Iub link capacity. In a further aspect, the NodeB may reduce the generation and/or transmission of one or more subsequent flow control requests according to a congestion factor. Such a congestion factor can be determined by the NodeB substantially concurrent with the determination of the congestion state and/or the determination of a downlink delay value. In an aspect, the congestion factor may be dependent upon the level of congestion in the Iub link, and may therefore be dependent upon the downlink delay value and/or other transmission rate parameters associated with the Iub link or one or more flows originating from the NodeB.

Figure 4:
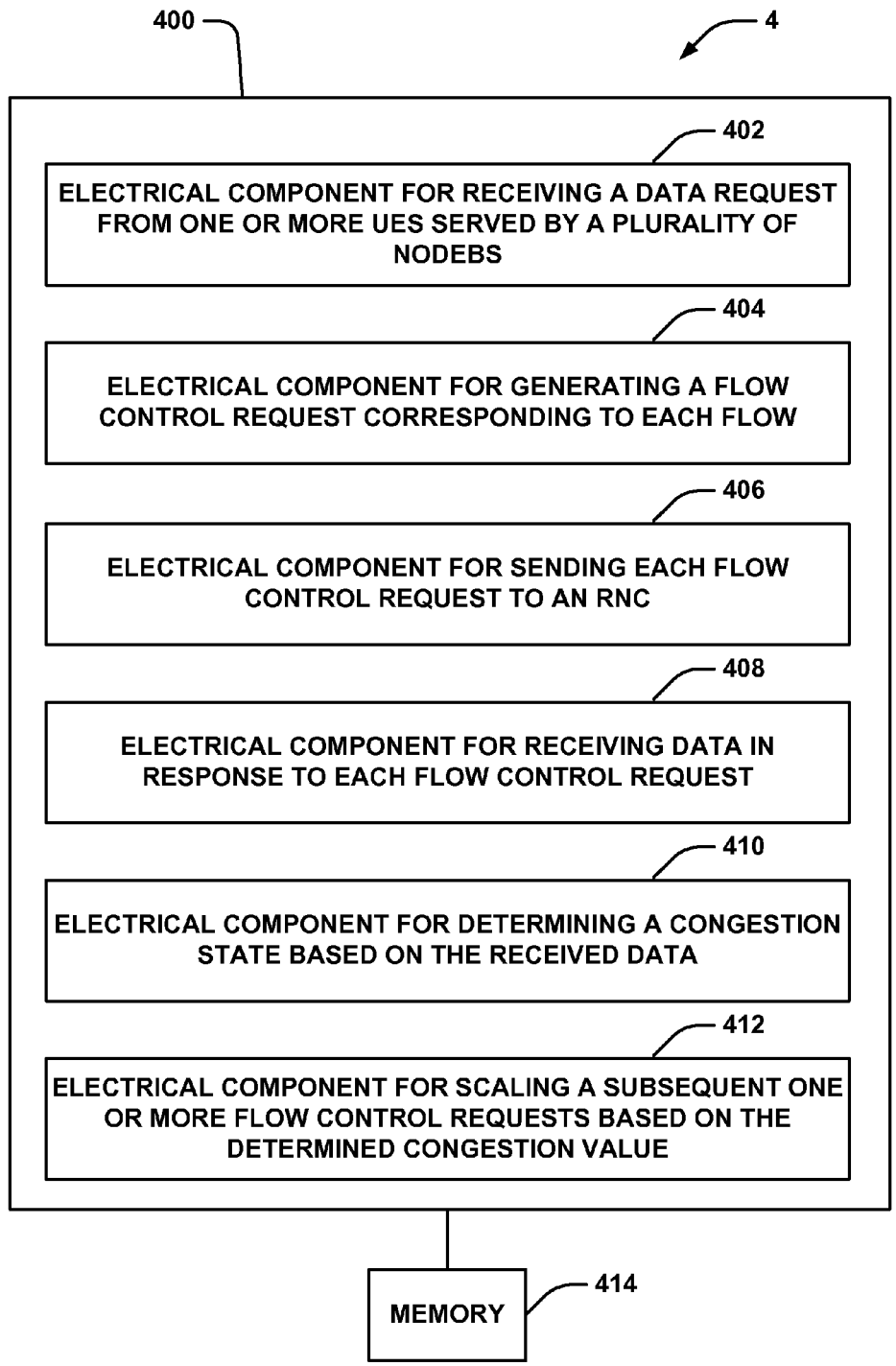
FIG. 4 is a component diagram illustrating aspects of a logical grouping of electrical components as contemplated by the present disclosure.

FIG. 4 illustrates an example system 4 for improved Iub link congestion management in multilink wireless environments. System 4 can, for example, reside at least partially within one or more network entities, such as, for example, NodeB 102. It is to be appreciated that system 4 is represented as including functional blocks, which can be functional blocks that represent functions implemented by a processor, software, or combination thereof (e.g., firmware). System 4 includes a logical grouping 400 of electrical components that can act in conjunction. For instance, logical grouping 400 can include an electrical component 402 for receiving a data request from one or more UEs served by a plurality of NodeBs. In an aspect, electrical component 402 may comprise flow control request managing component 120 (FIGS. 1 and 2), a transceiver (e.g., transceiver 910, FIG. 9), and/or a communications component (e.g., communications component 806, FIG. 8). Additionally, logical grouping 400 can include an electrical component 404 for generating a flow control request corresponding to each flow between each UE served by a NodeB and the NodeB. In an aspect, electrical component 404 may comprise flow control request generating component 200 (FIG. 2). In an additional aspect, logical grouping 400 can include an electrical component 406 for sending each flow control request to an RNC. In an aspect, electrical component 406 may comprise flow control request managing component 120 (FIGS. 1 and 2), a transceiver (e.g., transceiver 910, FIG. 9), and/or a communications component (e.g., communications component 806, FIG. 8). Furthermore, logical grouping 400 can include an electrical component 408 for receiving data in response to each flow control request. In an aspect, electrical component 408 may comprise flow control request managing component 120 (FIGS. 1 and 2), a transceiver (e.g., transceiver 910, FIG. 9), and/or a communications component (e.g., communications component 806, FIG. 8). In an additional aspect, logical grouping 400 can include an electrical component 410 for determining a congestion state based on a downlink delay from the RNC and detected in the received data. In an aspect, electrical component 410 may comprise congestion state determining component 214 (FIG. 2). Additionally, logical grouping 400 can include an electrical component 412 for scaling a subsequent one or more flow control requests based on the determined congestion value(s). In an aspect, electrical component 412 may comprise flow control request scaling component 228 (FIG. 2).

Additionally, system 4 can include a memory 414 that retains instructions for executing functions associated with the electrical components 402, 404, 406, 408, 410, and 412, stores data used or obtained by the electrical components 402, 404, 406, 408, 410, and 412, etc. While shown as being external to memory 414, it is to be understood that one or more of the electrical components 402, 404, 406, 408, 410, and 412 can exist within memory 414. In one example, electrical components 402, 404, 406, 408, 410, and 412 can comprise at least one processor, or each electrical component 402, 404, 406, 408, 410, and 412 can be a corresponding module of at least one processor. Moreover, in an additional or alternative example, electrical components 402, 404, 406, 408, 410, and 412 can be a computer program product including a computer readable medium, where each electrical component 402, 404, 406, 408, 410, and 412 can be corresponding code.

Figure 5:
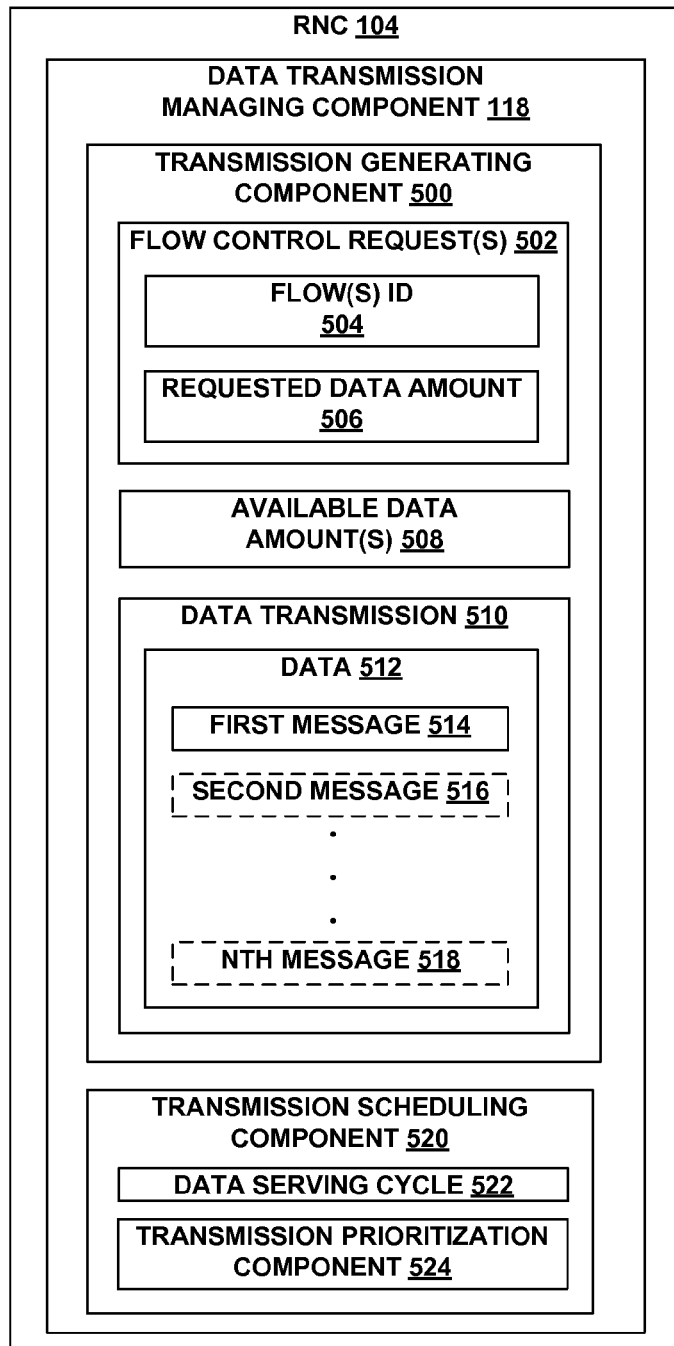
FIG. 5 is block diagram illustrating an example of a RNC in aspects of the present disclosure.

FIG. 5 illustrates an example radio network controller 104 according to aspects of the present disclosure. In an aspect, RNC 104 may include a data transmission managing component 118, which may be configured to manage transmission of one or more data messages or packets to one or more NodeBs in a wireless network, such as, but not limited to, a multilink-enabled wireless network. Data transmission managing component 118 may transmit the one or more data messages to each of the one or more NodeBs according to one or more flow control requests.

In an aspect, data transmission managing component 118 may include a transmission generating component 500 that may be configured to generate one or more data transmissions 510 based on one or more flow control request(s) 502 received from one or more NodeBs over an Iub link. In an aspect, each of the one or more flow control requests may include an associated flow identification (ID) 504, which may allow the RNC 104 to determine to which flow and/or associated UE that each of the one or more flow control requests relates. Furthermore, each of the one or more flow control requests 506 may include a requested data amount 506, which may indicate to transmission generating component 500 the amount of data 512 to be transmitted to the requesting NodeB. In an additional aspect, RNC 104 may receive the one or more flow control requests 502 periodically according to a predetermined or otherwise obtained flow control cycle, which may be configured and stored at the RNC 104.

Furthermore, in response to receiving the one or more flow control requests 502, transmission generating component 500 may generate one or more data transmissions 510. Each of data transmissions 510 may include data 512 and a flow ID that may correspond to flow ID 504 included in an associated flow control request 502 to allow for eventual correct routing of data transmission 510. In addition, in some aspects, the data 512 sent in response to the one or more flow control requests 502 may be sent in portions, wherein each portion is included in one of a plurality of N messages, such as first message 514 (where N equals 1), optional second message 516, and up to an Nth message 518.

In an additional non-limiting aspect, each of the one or more flow control requests 502 received by RNC 104 may include a requested data amount 506 as stated above, which RNC 104 or one or more components therein may sum to obtain a total requested data amount. In an aspect, data transmission managing component 118 may compare the total requested data amount to an available data amount 508, which, in a non-limiting aspect, may be stored on a per NodeB, per flow, per cell, and/or per network basis. Furthermore, where data transmission managing component 500 determines that available data amount 508 is less than the total requested data amount, RNC 104 may split the available data amount 508 proportionally to the requested data amounts 506 of the flow control requests 502 and send each of the proportional data amounts in one of a plurality of messages (e.g. messages 514, 516, 518).

Additionally, data transmission managing component 118 may include a transmission scheduling component 520, which may be configured to prioritize and schedule the transmission of data 512 from RNC 104. In a non-limiting example, transmission scheduling component may schedule transmission of data transmissions 510 according to the data serving cycle 522, which may be configured or otherwise obtained by RNC 104 from a user, NodeB, network administrator, or generated according to network parameters (e.g., loading, data transmission rate, Iub congestion, etc.). Furthermore, transmission scheduling component 520 may include a transmission prioritization component 524, which may be configured to prioritize two or more data transmissions based on, such as, but not limited to, UE type, flows, cells, NodeBs, or one or more parameters associated therewith. In a non-limiting example, transmission scheduling component 520 may prioritize the transmission of data associated with primary UEs to data associated with secondary UEs.

Figure 6:
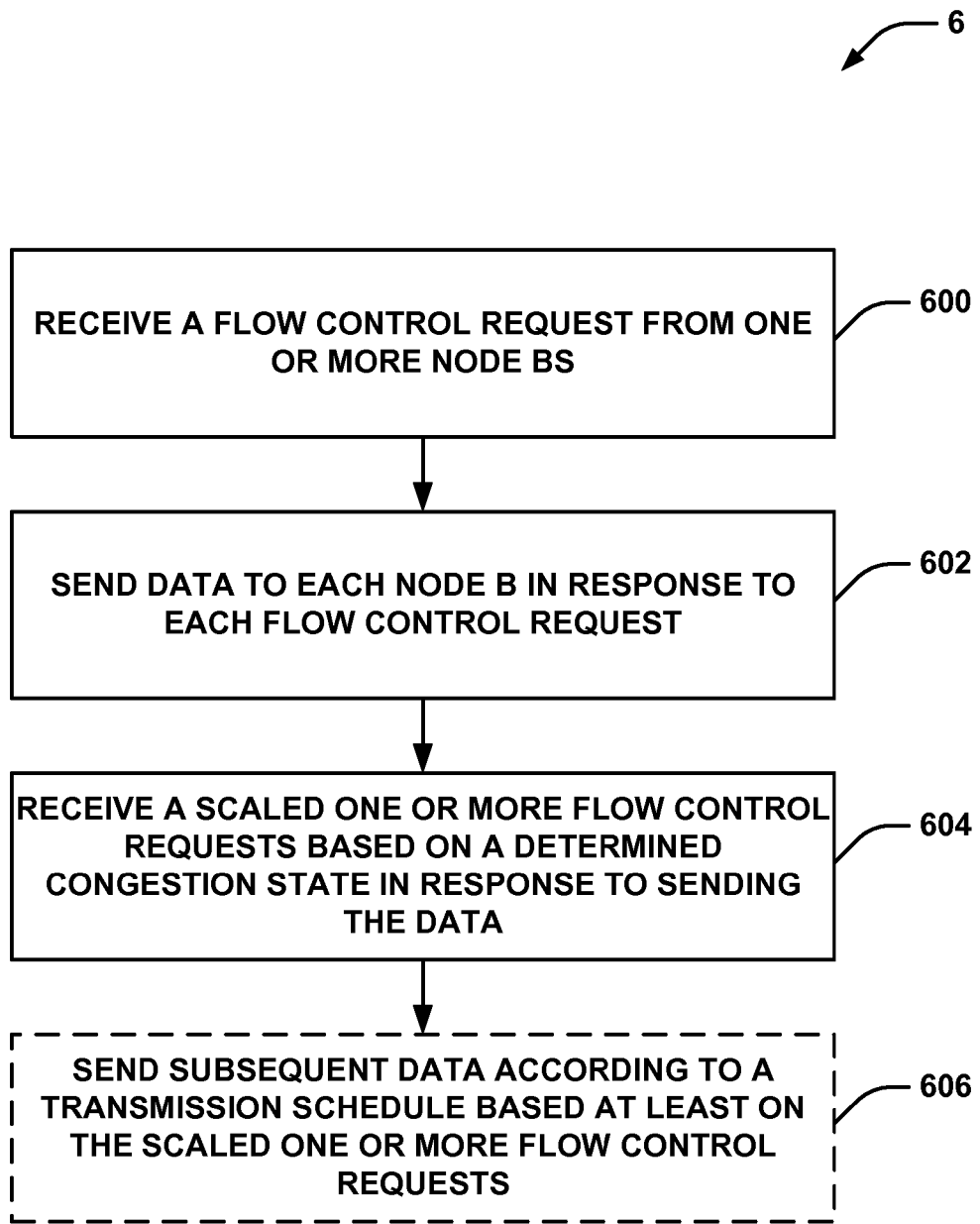
FIG. 6 is a flow diagram illustrating aspects of a method for supporting improved Iub link congestion control in a multilink wireless environment as provided by the present disclosure.

FIG. 6 illustrates an example methodology 6 for improving congestion on Iub links in wireless networks. In an aspect, at block 600, a radio network controller (RNC) may receive one or more flow control requests from one or more NodeBs, where each flow control request corresponds to a flow with a UE. In a non-limiting example, the RNC may receive the one or more flow control requests according to a flow control cycle. Additionally, each of the one or more flow control requests may include a requested data amount and an associated flow ID, UE ID, or NodeB ID for eventual data transmission routing.

In an additional aspect, at block 602, the RNC may send data to one or more NodeBs in response to each of the one or more flow control requests. In an aspect, the RNC may generate and send the data in portions, for example, in a plurality of messages. Furthermore, in an additional aspect, when data is sent in portions in N messages, one such message may be sent once per data serving cycle, which may be represented by $T_{checking}$. In an additional non-limiting example, the amount of the portion of data to be sent by the NodeB may be $R_i \times (T_{checking}/T_{fc})$, where $R_i$ may represent a requested data amount included in a flow control request pertaining to the data to be sent and $T_{fc}$ may represent a flow control cycle.

In an additional aspect, the RNC may sum a plurality of requested data amounts from received flow control requests to obtain a total requested data amount. Utilizing this total requested data amount, the RNC may thereafter determine that an available amount of data available to send at the RNC is less than the total requested data amount by a deficit amount. Based at least on this determination, the RNC may split the available amount of data to send in proportion to each of the requested data amounts received in the flow control requests and may place the resulting proportional portions of the available amount of data into each of a plurality of messages. Thereafter, at block 604, for example, the RNC may send one or more of these messages that contain a proportional amount of the available data in response to the flow control requests. In a further aspect, the RNC may simply transmit the available amount of data in response to one or more flow control requests and discard a credit corresponding to the deficit amount.

At block 604, the RNC may receive a scaled one or more flow control requests based on a determined congestion state associated with an Iub link in response to sending data to at least one NodeB, for example, at block 602. Furthermore, upon receiving one or more scaled flow control requests, the RNC may optionally send subsequent data based on at least the scaled one or more flow control requests at block 606.

In a further non-limiting example, the RNC may prioritize the sending of data based on the UE type that is to eventually receive the sent data. For example, the RNC may prioritize primary UEs over secondary UEs or may carry out a prioritization scheme implemented at one or more NodeBs based on a UE type prioritization. Additionally, the RNC may prioritize data transmissions based on a time that the corresponding flow control requests were received at the RNC. As such, the RNC may improve congestion conditions on one or more Iub links between the RNC and one or more NodeBs.

Figure 7:
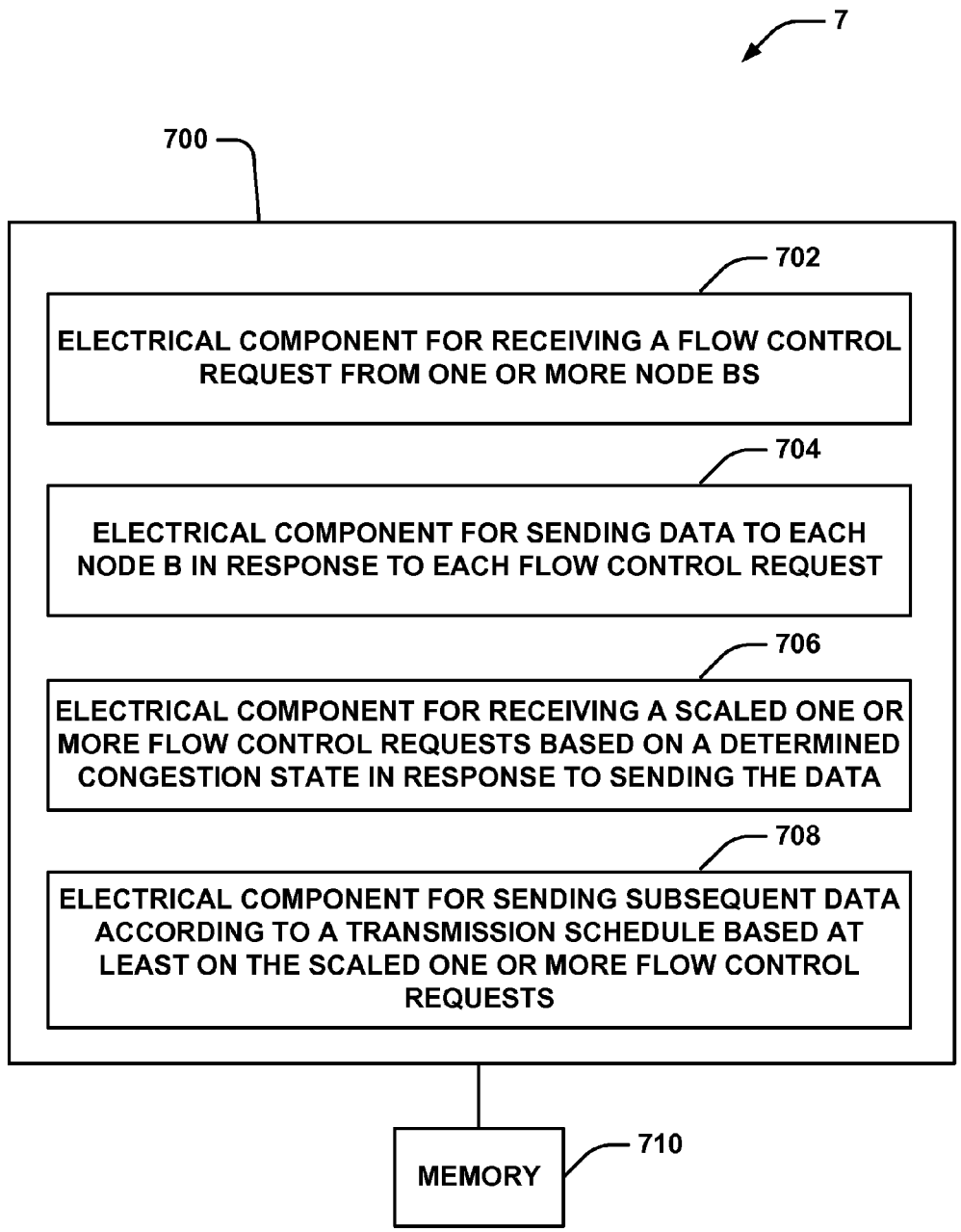
FIG. 7 is a component diagram illustrating aspects of a logical grouping of electrical components as contemplated by the present disclosure.

FIG. 7 illustrates an example system 7 for improved Iub link congestion management in multilink wireless environments. For example, system 7 can reside at least partially within one or more network entities, such as an RNC. It is to be appreciated that system 7 is represented as including functional blocks that may be implemented by a processor, software, or combination thereof (e.g., firmware). System 7 includes a logical grouping 700 of electrical components that can act in conjunction. For instance, logical grouping 700 can include an electrical component 702 for receiving a flow control request from one or more NodeBs. In an aspect, electrical component 702 may comprise data transmission managing component 118 (FIGS. 1 and/or 5), a transceiver (e.g., transceiver 910, FIG. 9), and/or a communications component (e.g., communications component 806, FIG. 8). Additionally, logical grouping 700 can include an electrical component 704 for sending data to each NodeB in response to each flow control request. In an aspect, electrical component 704 may comprise data transmission managing component 118 (FIGS. 1 and/or 5), a transceiver (e.g., transceiver 910, FIG. 9), and/or a communications component (e.g., communications component 806, FIG. 8). In an additional aspect, logical grouping 700 can include an electrical component 706 for receiving a scaled one or more flow control requests based on a determined congestion state in response to sending the data. In an aspect, electrical component 706 may comprise data transmission managing component 118 (FIGS. 1 and/or 5), a transceiver (e.g., transceiver 910, FIG. 9), and/or a communications component (e.g., communications component 806, FIG. 8). Furthermore, logical grouping 700 can include an optional electrical component 708 for sending subsequent data according to a transmission schedule based at least on the scaled one or more flow control requests. In an aspect, electrical component 708 may comprise data transmission managing component 118 (FIGS. 1 and/or 5), a transceiver (e.g., transceiver 910, FIG. 9), and/or a communications component (e.g., communications component 806, FIG. 8).

Additionally, system 7 can include a memory 710 that retains instructions for executing functions associated with the electrical components 702, 704, 706, and 708, stores data used or obtained by the electrical components 702, 704, 706, and 708, etc. While shown as being external to memory 710, it is to be understood that one or more of the electrical components 702, 704, 706, and 708 can exist within memory 710. In one example, electrical components 702, 704, 706, and 708 can comprise at least one processor, or each electrical component 702, 704, 706, and 708 can be a corresponding module of at least one processor. Moreover, in an additional or alternative example, electrical components 702, 704, 706, and 708 can be a computer program product including a computer readable medium, where each electrical component 702, 704, 706, and 708 can be corresponding code.

Figure 8:
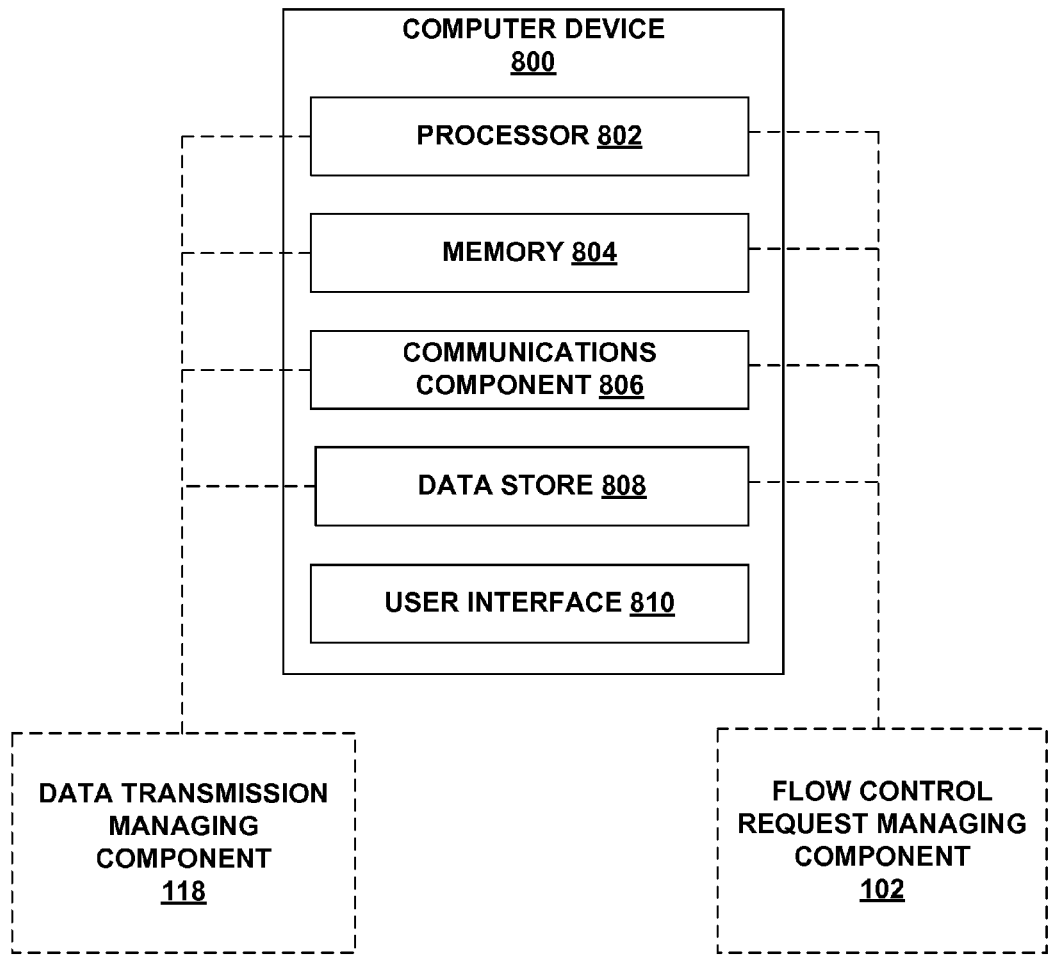
FIG. 8 is a block diagram illustrating aspects of a computer device according to the present disclosure.

Referring to FIG. 8, in one aspect, any of UE 100, or the one or more network entities 11 (FIG. 1) may be represented by a specially programmed or configured computer device 800. Computer device 800 includes a processor 802 for carrying out processing functions associated with one or more of components and functions described herein. Processor 802 can include a single or multiple set of processors or multi-core processors. Moreover, processor 802 can be implemented as an integrated processing system and/or a distributed processing system.

Computer device 800 further includes a memory 804, such as for storing data used herein and/or local versions of applications being executed by processor 802. Memory 804 can include any type of memory usable by a computer, such as random access memory (RAM), read only memory (ROM), tapes, magnetic discs, optical discs, volatile memory, non-volatile memory, and any combination thereof.

Further, computer device 800 includes a communications component 806 that provides for establishing and maintaining communications with one or more parties utilizing hardware, software, and services as described herein. Communications component 806 may carry communications between components on computer device 800, as well as between computer device 800 and external devices, such as devices located across a communications network and/or devices serially or locally connected to computer device 800. For example, communications component 806 may include one or more buses, and may further include transmit chain components and receive chain components associated with a transmitter and receiver, respectively, or a transceiver, operable for interfacing with external devices. In an additional aspect, communications component 806 may be configured to receive one or more pages from one or more subscriber networks. In a further aspect, such a page may correspond to the second subscription and may be received via the first technology type communication services.

Additionally, computer device 800 may further include a data store 808, which can be any suitable combination of hardware and/or software, that provides for mass storage of information, databases, and programs employed in connection with aspects described herein. For example, data store 808 may be a data repository for applications not currently being executed by processor 802.

Computer device 800 may additionally include a user interface component 810 operable to receive inputs from a user of computer device 800, and further operable to generate outputs for presentation to the user. User interface component 810 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

In a network entity or base station implementation, such as for NodeB 102 of FIG. 1 and/or FIG. 2, computer device 800 may include flow control request managing component 120, such as in specially programmed computer readable instructions or code, firmware, hardware, or some combination thereof.

In addition, in a network controller or RNC, such as for RNC 104 of FIG. 1 and/or FIG. 5, computer device 800 may include data transmission managing component 118, such as in specially programmed computer readable instructions or code, firmware, hardware, or some combination thereof.

Figure 9:
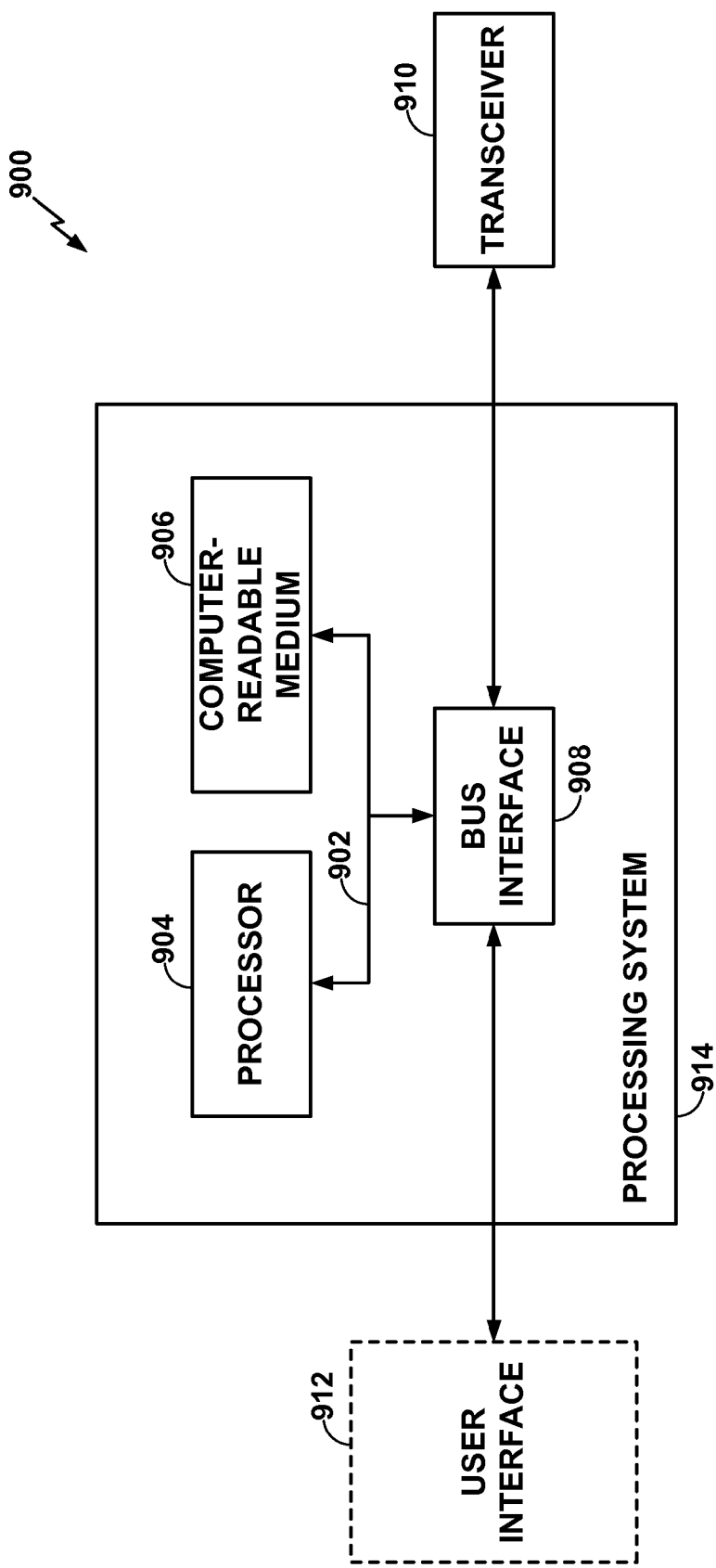
FIG. 9 is a block diagram illustrating an example of a hardware implementation for an apparatus employing a processing system.

FIG. 9 is a block diagram illustrating an example of a hardware implementation for an apparatus 900 employing a processing system 914 for carrying out aspects of the present disclosure, such as methods for improved congestion control in one or more Iub links in multiflow communications environments. In this example, the processing system 914 may be implemented with a bus architecture, represented generally by a bus 902. The bus 902 may include any number of interconnecting buses and bridges depending on the specific application of the processing system 914 and the overall design constraints. The bus 902 links together various circuits including one or more processors, represented generally by the processor 904, and computer-readable media, represented generally by the computer-readable medium 906. The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software.

Figure 10:
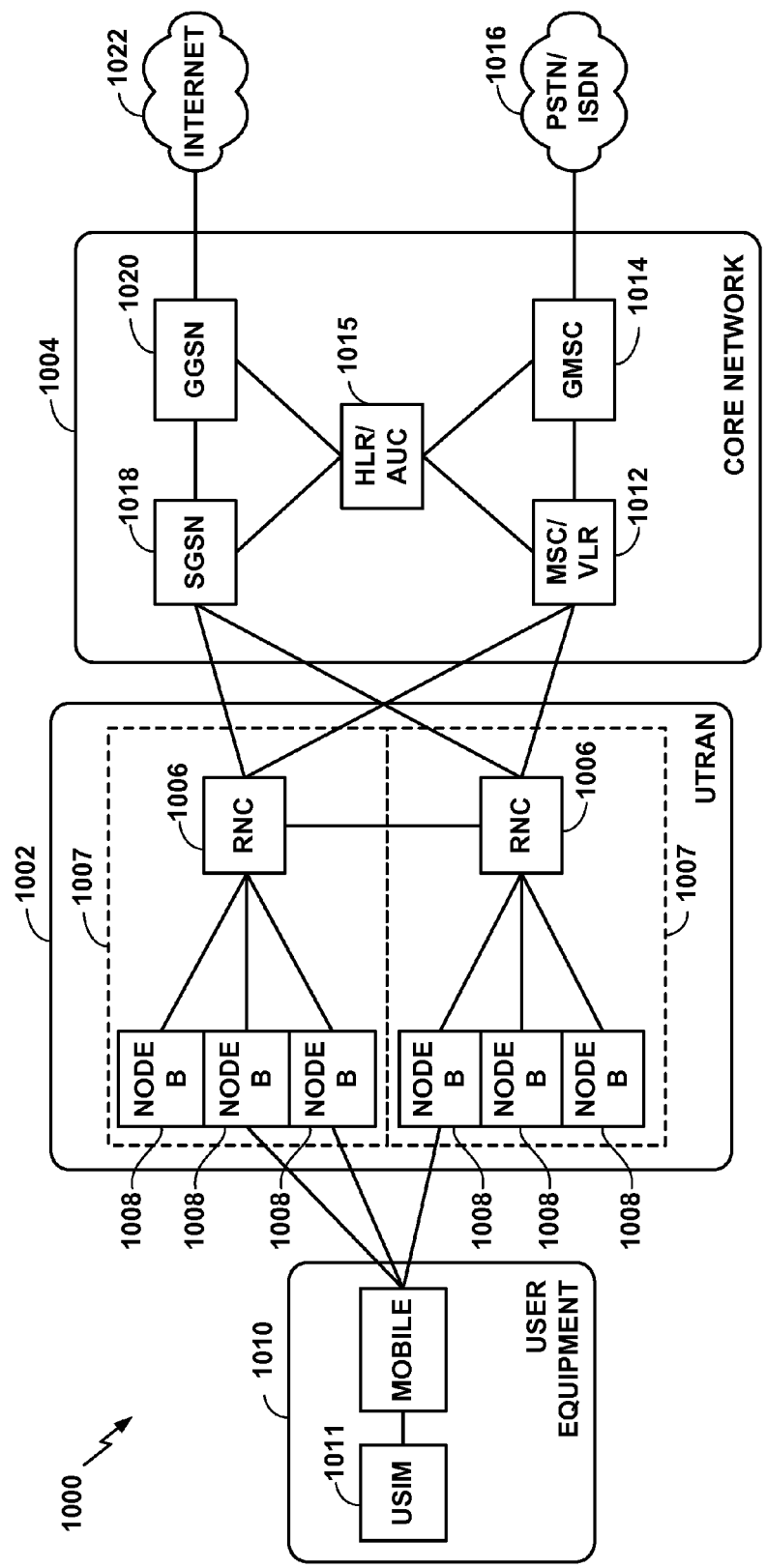
FIG. 10 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 10 are presented with reference to a UMTS system 1000 employing a W-CDMA air interface. A UMTS network includes three interacting domains: a Core Network (CN) 1004, a UMTS Terrestrial Radio Access Network (UTRAN) 1002, and User Equipment (UE) 1010. In an aspect, UE 1010 may be UE 100 (FIG. 1), and UMTS 1002 may comprise RNC 104 (FIG. 1 and/or FIG. 5) and/or NodeBs 102 (FIG. 1 and/or FIG. 2). In this example, the UTRAN 1002 provides various wireless services including telephony, video, data, messaging, broadcasts, and/or other services. The UTRAN 1002 may include a plurality of Radio Network Subsystems (RNSs) such as an RNS 1007, each controlled by a respective Radio Network Controller (RNC) such as an RNC 1006. Here, the UTRAN 1002 may include any number of RNCs 1006 and RNSs 1007 in addition to the RNCs 1006 and RNSs 1007 illustrated herein. The RNC 1006 is an apparatus responsible for, among other things, assigning, reconfiguring, and releasing radio resources within the RNS 1007. The RNC 1006 may be interconnected to other RNCs (not shown) in the UTRAN 1002 through various types of interfaces such as a direct physical connection, a virtual network, or the like, using any suitable transport network.

Communication between a UE 1010 and a NodeB 1008 may be considered as including a physical (PHY) layer and a medium access control (MAC) layer. Further, communication between a UE 1010 and an RNC 1006 by way of a respective NodeB 1008 may be considered as including a radio resource control (RRC) layer. In the instant specification, the PHY layer may be considered layer 1; the MAC layer may be considered layer 10; and the RRC layer may be considered layer 3. Information hereinbelow utilizes terminology introduced in the RRC Protocol Specification, 3GPP TS 105.331 v9.1.0, incorporated herein by reference.

The geographic region covered by the RNS 1007 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1008 are shown in each RNS 1007; however, the RNSs 1007 may include any number of wireless Node Bs. The Node Bs 1008 provide wireless access points to a CN 1004 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1010 may further include a universal subscriber identity module (USIM) 1011, which contains a user's subscription information to a network. For illustrative purposes, one UE 1010 is shown in communication with a number of the Node Bs 1008. The DL, also called the forward link, refers to the communication link from a NodeB 1008 to a UE 1010, and the UL, also called the reverse link, refers to the communication link from a UE 1010 to a NodeB 1008.

The CN 1004 interfaces with one or more access networks, such as the UTRAN 1002. As shown, the CN 1004 is a GSM core network. However, as those skilled in the art will recognize, the various concepts presented throughout this disclosure may be implemented in a RAN, or other suitable access network, to provide UEs with access to types of CNs other than GSM networks.

The CN 1004 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1004 supports circuit-switched services with a MSC 1012 and a GMSC 1014. In some applications, the GMSC 1014 may be referred to as a media gateway (MGW). One or more RNCs, such as the RNC 1006, may be connected to the MSC 1012. The MSC 1012 is an apparatus that controls call setup, call routing, and UE mobility functions. The MSC 1012 also includes a VLR that contains subscriber-related information for the duration that a UE is in the coverage area of the MSC 1012. The GMSC 1014 provides a gateway through the MSC 1012 for the UE to access a circuit-switched network 1016. The GMSC 1014 includes a home location register (HLR) 1015 containing subscriber data, such as the data reflecting the details of the services to which a particular user has subscribed. The HLR is also associated with an authentication center (AuC) that contains subscriber-specific authentication data. When a call is received for a particular UE, the GMSC 1014 queries the HLR 1015 to determine the UE's location and forwards the call to the particular MSC serving that location.

The CN 1004 also supports packet-data services with a serving GPRS support node (SGSN) 1018 and a gateway GPRS support node (GGSN) 1020. GPRS, which stands for General Packet Radio Service, is designed to provide packet-data services at speeds higher than those available with standard circuit-switched data services. The GGSN 1020 provides a connection for the UTRAN 1002 to a packet-based network 1022. The packet-based network 1022 may be the Internet, a private data network, or some other suitable packet-based network. The primary function of the GGSN 1020 is to provide the UEs 1010 with packet-based network connectivity. Data packets may be transferred between the GGSN 1020 and the UEs 1010 through the SGSN 1018, which performs primarily the same functions in the packet-based domain as the MSC 1012 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 1008 and a UE 1010. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1010 provides feedback to the node B 1008 over the HS-DPCCH to indicate whether it correctly decoded a packet on the downlink.

HS-DPCCH further includes feedback signaling from the UE 1010 to assist the node B 1008 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 1008 and/or the UE 1010 may have multiple antennas supporting MIMO technology. The use of MIMO technology enables the node B 1008 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1010 to increase the data rate or to multiple UEs 1010 to increase the overall system capacity. This is achieved by spatially precoding each data stream and then transmitting each spatially precoded stream through a different transmit antenna on the downlink. The spatially precoded data streams arrive at the UE(s) 1010 with different spatial signatures, which enables each of the UE(s) 1010 to recover the one or more the data streams destined for that UE 1010. On the uplink, each UE 1010 may transmit one or more spatially precoded data streams, which enables the node B 1008 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 11:
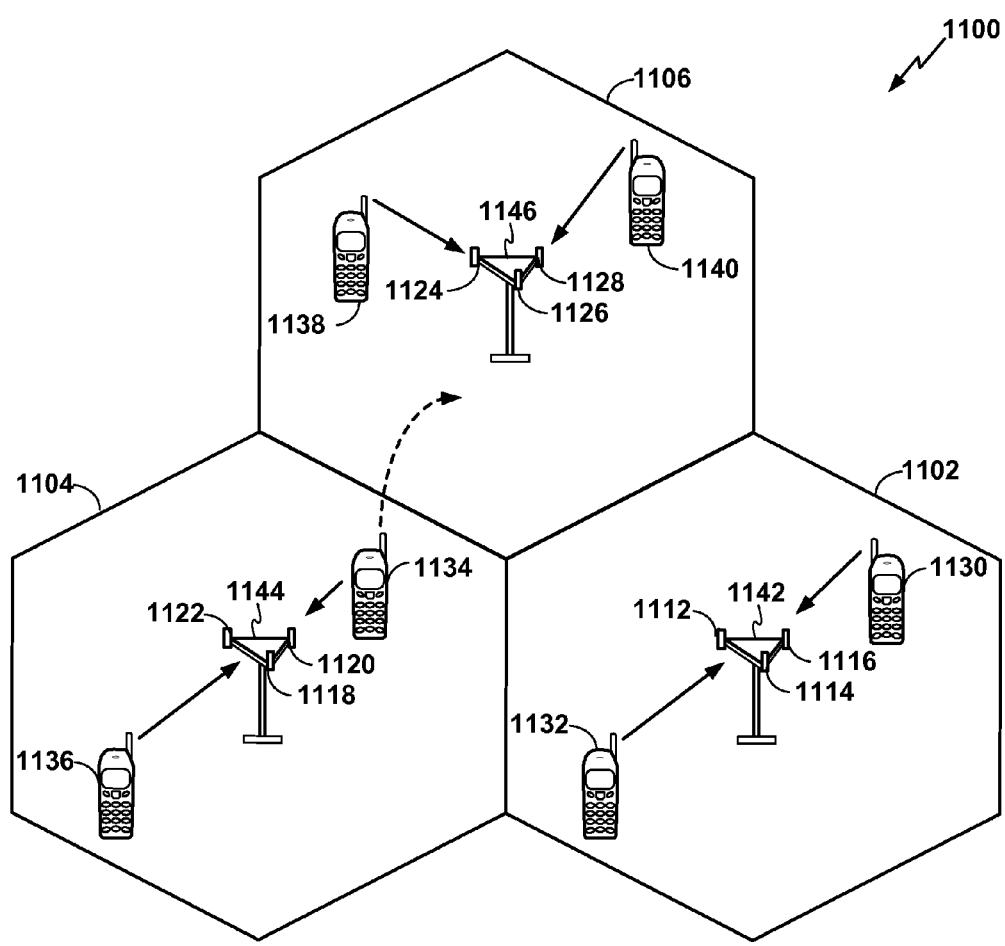
FIG. 11 is a conceptual diagram illustrating an example of an access network.

FIG. 11 illustrates an access network 1100 in a UTRAN architecture. The multiple access wireless communication system includes multiple cellular regions (cells), including cells 1102, 1104, and 1106, each of which may include one or more sectors. The multiple sectors can be formed by groups of antennas with each antenna responsible for communication with UEs in a portion of the cell. For example, in cell 1102, antenna groups 1112, 1114, and 1116 may each correspond to a different sector. In cell 1104, antenna groups 1118, 1120, and 1122 each correspond to a different sector. In cell 1106, antenna groups 1124, 1126, and 1128 each correspond to a different sector. The cells 1102, 1104 and 1106 may include several wireless communication devices, e.g., User Equipment or UEs, which may be in communication with one or more sectors of each cell 1102, 1104 or 1106. For example, UEs 1130 and 1132 may be in communication with NodeB 1142, UEs 1134 and 1136 may be in communication with NodeB 1144, and UEs 1138 and 1140 can be in communication with NodeB 1146. Here, each NodeB 1142, 1144, 1146 is configured to provide an access point to a CN 1004 (FIG. 4) for all the UEs 1130, 1132, 1134, 1136, 1138, 1140 in the respective cells 1102, 1104, and 1106.

As the UE 1134 moves from the illustrated location in cell 1104 into cell 1106, a serving cell change (SCC) or handover may occur in which communication with the UE 1134 transitions from the cell 1104, which may be referred to as the source cell, to cell 1106, which may be referred to as the target cell. Management of the handover procedure may take place at the UE 1134, at the Node Bs corresponding to the respective cells, at a radio network controller 1006 (FIG. 6), or at another suitable node in the wireless network. For example, during a call with the source cell 1104, or at any other time, the UE 1134 may monitor various parameters of the source cell 1104 as well as various parameters of neighboring cells such as cells 1106 and 1102. Further, depending on the quality of these parameters, the UE 1134 may maintain communication with one or more of the neighboring cells. During this time, the UE 1134 may maintain an Active Set, that is, a list of cells that the UE 1134 is simultaneously connected to (i.e., the UTRA cells that are currently assigning a downlink dedicated physical channel DPCH or fractional downlink dedicated physical channel F-DPCH to the UE 1134 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 12:
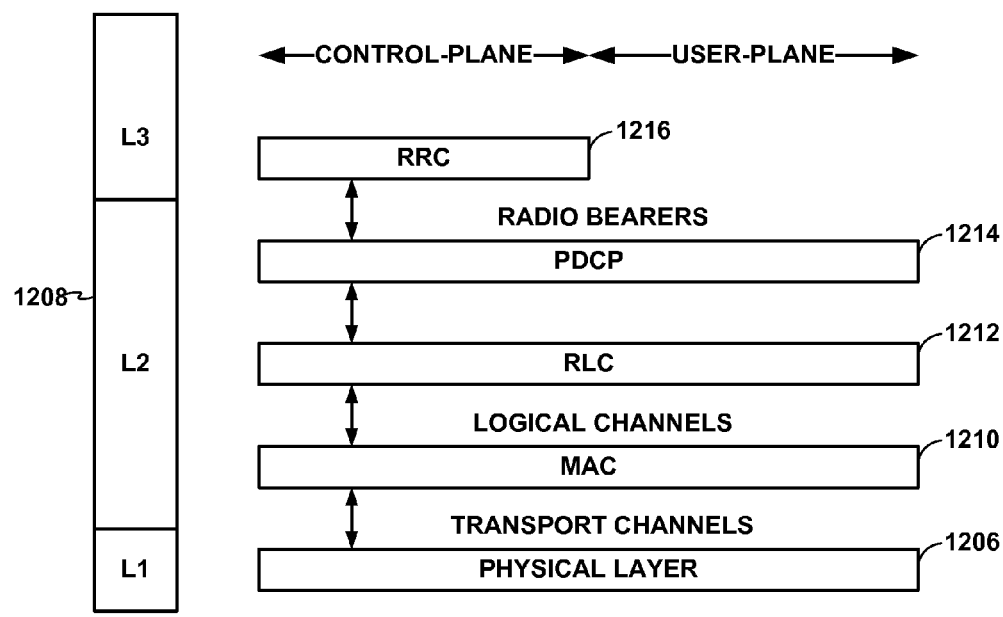
FIG. 12 is a conceptual diagram illustrating an example of a radio protocol architecture for the user and control plane.

The radio protocol architecture may take on various forms depending on the particular application. An example for an HSPA system will now be presented with reference to FIG. 12. FIG. 12 is a conceptual diagram illustrating an example of the radio protocol architecture for the user and control planes.

Turning to FIG. 12, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 1206. Layer 2 (L2 layer) 1208 is above the physical layer 1206 and is responsible for the link between the UE and node B over the physical layer 1206.

In the user plane, the L2 layer 1208 includes a media access control (MAC) sublayer 1210, a radio link control (RLC) sublayer 1212, and a packet data convergence protocol (PDCP) 1214 sublayer, which are terminated at the node B on the network side. Although not shown, the UE may have several upper layers above the L2 layer 1208 including a network layer (e.g., IP layer) that is terminated at a PDN gateway on the network side, and an application layer that is terminated at the other end of the connection (e.g., far end UE, server, etc.).

The PDCP sublayer 1214 provides multiplexing between different radio bearers and logical channels. The PDCP sublayer 1214 also provides header compression for upper layer data packets to reduce radio transmission overhead, security by ciphering the data packets, and handover support for UEs between NodeBs. The RLC sublayer 1212 provides segmentation and reassembly of upper layer data packets, retransmission of lost data packets, and reordering of data packets to compensate for out-of-order reception due to hybrid automatic repeat request (HARQ). The MAC sublayer 1210 provides multiplexing between logical and transport channels. The MAC sublayer 1210 is also responsible for allocating the various radio resources (e.g., resource blocks) in one cell among the UEs. The MAC sublayer 1210 is also responsible for HARQ operations.

Figure 13:
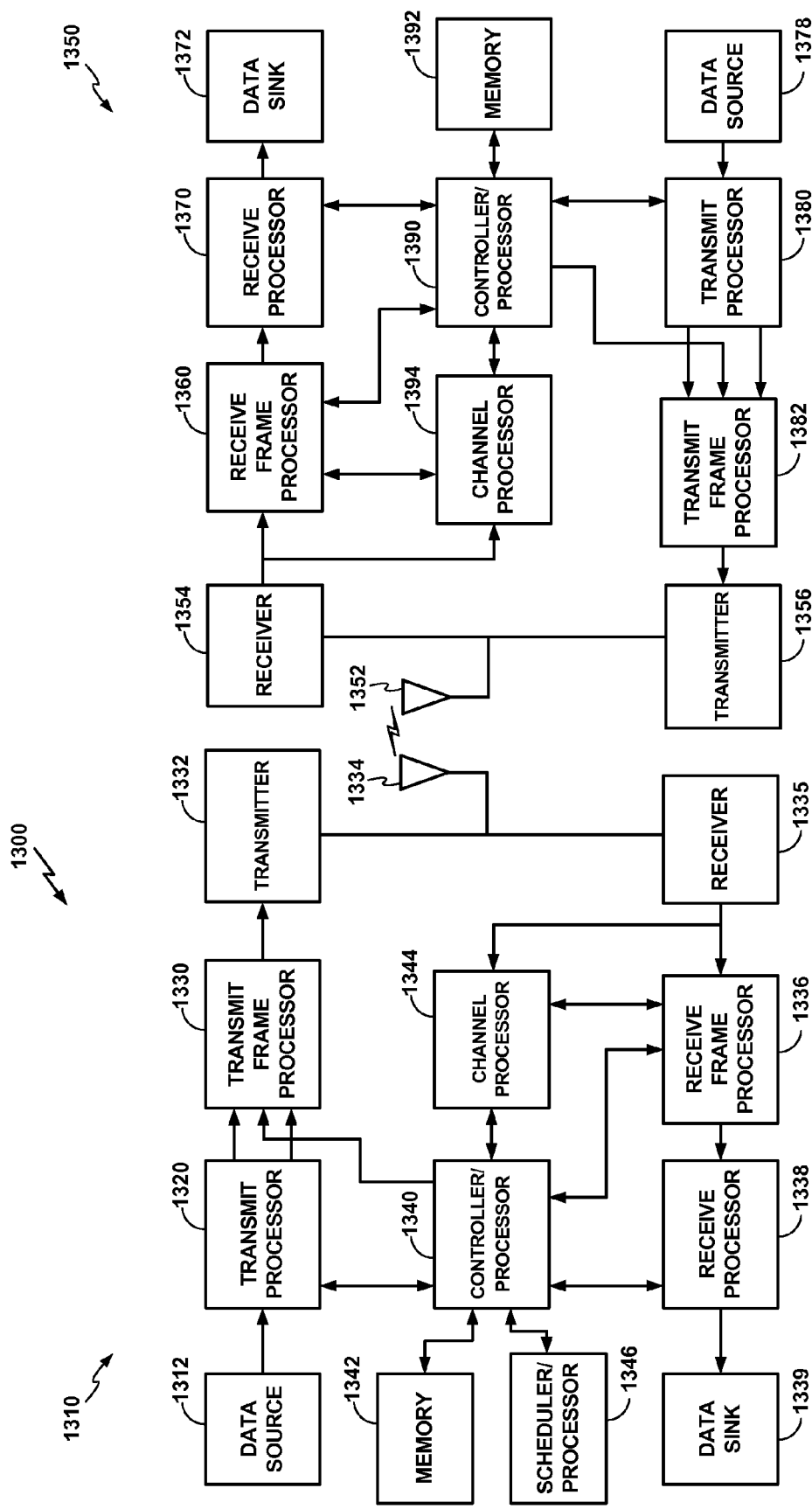
FIG. 13 is a block diagram conceptually illustrating an example of a NodeB in communication with a UE in a telecommunications system.

FIG. 13 is a block diagram of a NodeB 1310 in communication with a UE 1350, where the NodeB 1310 may be the NodeB 1008 in FIG. 10 and/or NodeB 102 of FIG. 1 and/or FIG. 2, and the UE 1350 may be the UE 1010 in FIG. 10 and/or UE 100 of FIG. 1. In the downlink communication, a transmit processor 1320 may receive data from a data source 1312 and control signals from a controller/processor 1340. The transmit processor 1320 provides various signal processing functions for the data and control signals, as well as reference signals (e.g., pilot signals). For example, the transmit processor 1320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1344 may be used by a controller/processor 1340 to determine the coding, modulation, spreading, and/or scrambling schemes for the transmit processor 1320. These channel estimates may be derived from a reference signal transmitted by the UE 1350 or from feedback from the UE 1350. The symbols generated by the transmit processor 1320 are provided to a transmit frame processor 1330 to create a frame structure. The transmit frame processor 1330 creates this frame structure by multiplexing the symbols with information from the controller/processor 1340, resulting in a series of frames. The frames are then provided to a transmitter 1332, which provides various signal conditioning functions including amplifying, filtering, and modulating the frames onto a carrier for downlink transmission over the wireless medium through antenna 1334. The antenna 1334 may include one or more antennas, for example, including beam steering bidirectional adaptive antenna arrays or other similar beam technologies.

At the UE 1350, a receiver 1354 receives the downlink transmission through an antenna 1352 and processes the transmission to recover the information modulated onto the carrier. The information recovered by the receiver 1354 is provided to a receive frame processor 1360, which parses each frame, and provides information from the frames to a channel processor 1394 and the data, control, and reference signals to a receive processor 1370. The receive processor 1370 then performs the inverse of the processing performed by the transmit processor 1320 in the NodeB 1310. More specifically, the receive processor 1370 descrambles and despreads the symbols, and then determines the most likely signal constellation points transmitted by the NodeB 1310 based on the modulation scheme. These soft decisions may be based on channel estimates computed by the channel processor 1394. The soft decisions are then decoded and deinterleaved to recover the data, control, and reference signals. The CRC codes are then checked to determine whether the frames were successfully decoded. The data carried by the successfully decoded frames will then be provided to a data sink 1372, which represents applications running in the UE 1350 and/or various user interfaces (e.g., display). Control signals carried by successfully decoded frames will be provided to a controller/processor 1390. When frames are unsuccessfully decoded by the receiver processor 1370, the controller/processor 1390 may also use an acknowledgement (ACK) and/or negative acknowledgement (NACK) protocol to support retransmission requests for those frames.

In the uplink, data from a data source 1378 and control signals from the controller/processor 1390 are provided to a transmit processor 1380. The data source 1378 may represent applications running in the UE 1350 and various user interfaces (e.g., keyboard). Similar to the functionality described in connection with the downlink transmission by the NodeB 1310, the transmit processor 1380 provides various signal processing functions including CRC codes, coding and interleaving to facilitate FEC, mapping to signal constellations, spreading with OVSFs, and scrambling to produce a series of symbols. Channel estimates, derived by the channel processor 1394 from a reference signal transmitted by the NodeB 1310 or from feedback contained in the midamble transmitted by the NodeB 1310, may be used to select the appropriate coding, modulation, spreading, and/or scrambling schemes. The symbols produced by the transmit processor 1380 will be provided to a transmit frame processor 1382 to create a frame structure. The transmit frame processor 1382 creates this frame structure by multiplexing the symbols with information from the controller/processor 1390, resulting in a series of frames. The frames are then provided to a transmitter 1356, which provides various signal conditioning functions including amplification, filtering, and modulating the frames onto a carrier for uplink transmission over the wireless medium through the antenna 1352.

The uplink transmission is processed at the NodeB 1310 in a manner similar to that described in connection with the receiver function at the UE 1350. A receiver 1335 receives the uplink transmission through the antenna 1334 and processes the transmission to recover the information modulated onto the carrier. The information recovered by the receiver 1335 is provided to a receive frame processor 1336, which parses each frame, and provides information from the frames to the channel processor 1344 and the data, control, and reference signals to a receive processor 1338. The receive processor 1338 performs the inverse of the processing performed by the transmit processor 1380 in the UE 1350. The data and control signals carried by the successfully decoded frames may then be provided to a data sink 1339 and the controller/processor, respectively. If some of the frames were unsuccessfully decoded by the receive processor, the controller/processor 1340 may also use an acknowledgement (ACK) and/or negative acknowledgement (NACK) protocol to support retransmission requests for those frames.

The controller/processors 1340 and 1390 may be used to direct the operation at the NodeB 1310 and the UE 1350, respectively. For example, the controller/processors 1340 and 1390 may provide various functions including timing, peripheral interfaces, voltage regulation, power management, and other control functions. The computer readable media of memories 1342 and 1392 may store data and software for the NodeB 1310 and the UE 1350, respectively. A scheduler/processor 1346 at the NodeB 1310 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. For example, various components illustrated in FIGS. 1, 2, 5, 7, and 8 may be implemented, for example, with a processing system. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Embodiments of the present invention have been described with reference to several aspects of the present invention. It would be appreciated that embodiments described in the context of one aspect may be used with other aspects without departing from the scope of the present invention.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart there from.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of data control in a multiflow downlink network, comprising:
   receiving, at a NodeB, a data request from one or more user equipment (UE), wherein each data request corresponds to a flow and the one or more UE is served by a plurality of NodeBs;
   generating a flow control request corresponding to each flow in response to each data request;
   sending each flow control request to a radio network controller (RNC);
   receiving data from the RNC in response to each flow control request;
   determining a congestion state based on the received data; and
   scaling, by the NodeB, a subsequent one or more flow control requests based on the determined congestion state.

2. The method of claim 1, wherein determining the congestion state is based on a downlink delay from the RNC detected in the received data.

3. The method of claim 1, wherein scaling the subsequent one or more flow control requests further comprises reducing the subsequent one or more flow control requests when the congestion state represents a reduction in an Iub link capacity of an Iub link between the NodeB and the RNC.

4. The method of claim 3, wherein reducing the subsequent one or more flow control requests further comprises reducing the subsequent one or more flow control requests according to a congestion factor.

5. The method of claim 1, wherein determining the congestion state and reducing the subsequent one or more flow control requests further comprises performing the determining and the reducing on a per flow basis.

6. The method of claim 1, wherein the congestion state comprises congested or not congested, and wherein determining the congestion state further comprises:
   determining, for each incoming packet of the received data, a downlink delay value;
   incrementing a counter of congested packets when the downlink delay value is greater than a delay threshold; and
   identifying that the congestion state is congested when the counter is greater than a congestion threshold.

7. The method of claim 6, wherein sending each flow control request to the RNC occurs periodically according to a flow control cycle, and wherein determining the congestion state is performed each flow control cycle.

8. The method of claim 1, wherein sending each flow control request to the RNC occurs periodically according to a flow control cycle, and wherein receiving data in response to each flow control request further comprises receiving the data in portions in each of a plurality of messages.

9. The method of claim 8, wherein receiving the data in portions further comprises receiving once a data serving cycle, $T_{checking}$, wherein an amount of the portion of the data received is up to $Ri*(T_{checking}/T_{fc})$, where Ri is a requested data amount from the flow control request and $T_{fc}$ represents the flow control cycle.

10. The method of claim 1, wherein generating a flow control request corresponding to each flow is further based on an estimated flow throughput and a target queuing delay for the respective flow.

11. The method of claim 1, wherein generating each flow control request further comprises prioritizing each flow control request corresponding to a primary UE over each flow control request corresponding to a secondary UE based on an Iub link capacity of an Iub link between the NodeB and the RNC.

12. The method of claim 11, wherein receiving the data requests further comprises a sum of requested capacities from all primary UEs greater than or equal to the Iub link capacity of the Iub link between the NodeB and the RNC, and wherein prioritizing each flow control request further comprises:
   distributing the Iub link capacity across all flow control requests corresponding to primary UEs in proportion to a requested capacity of each flow control request corresponding to each primary UE relative to a sum of all requested capacities in all data requests corresponding to primary UEs;
wherein generating the flow control request corresponding to each flow further comprises generating only for each flow corresponding to each primary UE; and
ignoring each data request corresponding to each secondary UE.

13. The method of claim 11, wherein receiving the data requests further comprises a sum of requested capacities from all primary UEs less than the Iub link capacity of the Iub link between the NodeB and the RNC, and wherein prioritizing each flow control request further comprises:
determining a remaining Iub link capacity after distributing a portion of the Iub link capacity for all flow control requests corresponding to the primary UEs; and
distributing the remaining Iub link capacity for each flow control request corresponding to each secondary UE in proportion to a requested capacity for each data request corresponding to each secondary UE.

14. The method of claim 1, wherein receiving the data request further comprises receiving a first data request from a primary UE and a second data request from a secondary UE, and further comprising prioritizing the primary UE over the secondary UE for serving the received data.

15. The method of claim 1, wherein receiving the data request further comprises receiving a first data request from a primary UE, a second data request from a secondary UE having inter-NodeB aggregation, and a third data request from a secondary UE having intra-NodeB aggregation, and further comprising:
determining a loading exceeds a loading threshold in a cell of the primary UE; and
prioritizing the primary UE and the secondary UE having inter-NodeB aggregation over the secondary UE having intra-NodeB aggregation for serving the received data.

16. The method of claim 1, wherein receiving the data request further comprises receiving a first data request from a primary UE and a second data request from a secondary UE, and further comprising:
determining a loading exceeds a loading threshold in a cell of the primary UE;
prioritizing the primary UE over the secondary UE; and
wherein generating the flow control request further comprises generating only for the primary UE.

17. The method of claim 1, further comprising:
determining whether data has been lost; and
increasing the scaling of the subsequent one or more flow control requests where data has been lost.

18. An apparatus for wireless communication, comprising:
a first receiver configured to receive, at a NodeB, a data request from one or more user equipment (UE), wherein each data request corresponds to a flow and the one or more UE is served by a plurality of NodeBs;
a processor configured to generate a flow control request corresponding to each flow in response to each data request;
a transmitter configured to send each flow control request to a radio network controller (RNC);
a second receiver configured to receive data from the RNC in response to each flow control request;
the processor configured to determine a congestion state based on the received data; and
a scaler configured to scale, at the NodeB, a subsequent one or more flow control requests based on the determined congestion state.

19. A non-transitory computer-readable medium storing computer executable code, for comprising:
code for receiving, at a NodeB, a data request from one or more user equipment (UE), wherein each data request corresponds to a flow and the one or more UE is served by a plurality of NodeBs;
code for generating a flow control request corresponding to each flow in response to each data request;
code for sending each flow control request to a radio network controller (RNC);
code for receiving data from the RNC in response to each flow control request;
code for determining a congestion state based on the received data; and
code for scaling, at the NodeB, a subsequent one or more flow control requests based on the determined congestion state.

20. An apparatus for wireless communication, comprising:
at least one processor; and
a memory coupled to the at least one processor,
wherein the at least one processor is configured to:
receive, at a NodeB, a data request from one or more user equipment (UE), wherein each data request corresponds to a flow and the one or more UE is served by a plurality of NodeBs;
generate a flow control request corresponding to each flow in response to each data request;
send each flow control request to a radio network controller (RNC);
receive data from the RNC in response to each flow control request;
determine a congestion state based on the received data; and
scale, at the NodeB, a subsequent one or more flow control requests based on the determined congestion state.

21. A method of data control in a multilink downlink network, comprising:
receiving, at a radio network controller (RNC), a flow control request from one or more NodeBs, wherein each flow control request corresponds to a flow with a user equipment (UE) and the flow is served by a plurality of NodeBs;
sending data to each of the one or more NodeBs, in response to each of the flow control request; and
receiving, from the one or more NodeBs, a scaled one or more flow control requests by the one or more NodeBs based on a determined congestion state by the one or more NodeBs in response to the sending of the data.

22. The method of claim 21, wherein receiving the flow control request further comprises receiving periodically according to a flow control cycle, and wherein sending data in response to each flow control request further comprises sending the data in portions in each of a plurality of messages.

23. The method of claim 22, wherein sending the data in portions further comprises sending once a data serving cycle, $T_{checking}$, wherein an amount of the portion of the data sent is up to $Ri*(T_{checking}/T_{fc})$, where Ri is a requested data amount from the flow control request and $T_{fc}$ represents the flow control cycle.

24. The method of claim 21, wherein receiving the flow control request further comprises receiving a plurality of flow control requests each having a respective requested data amount that when summed defines a total requested data amount, further comprising:
determining that an available amount of data to send is less than the total requested data amount;

splitting the available amount of data to send in proportion to each of the respective requested data amount of each of the plurality of flow control requests; and sending a plurality of messages each including a respective proportioned amount of the available amount of data in response to the plurality of flow control requests.

25. The method of claim 21, wherein receiving the flow control request further comprises receiving a requested data amount, further comprising:

determining that an available amount of data to send is less than the requested data amount, thereby defining a deficit amount;

sending the available amount of data in response to the flow control request; and discarding a credit corresponding to the deficit amount.

26. The method of claim 21, further comprising sending subsequent data according to a transmission schedule based at least in part on the scaled one or more flow control requests.

27. A method of data control in a multilink downlink network, comprising:

receiving, at a radio network controller (RNC), a flow control request from one or more NodeBs, wherein each flow control request corresponds to a flow with a user equipment (UE) and the flow is served by a plurality of NodeBs;

sending data to each of the one or more NodeBs, in response to each of the flow control request; and receiving, from the one or more NodeBs, a scaled one or more flow control requests by the one or more NodeBs based on a determined congestion state by the one or more NodeBs in response to the sending of the data.

28. A non-transitory computer-readable medium storing computer executable code, comprising:

code for receiving, at a radio network controller (RNC), a flow control request from one or more NodeBs, wherein each flow control request corresponds to a flow with a user equipment (UE) and the flow is served by a plurality of NodeBs;

code for sending data to each of the one or more NodeBs in response to each flow control request; and code for receiving, from the one or more NodeBs, a scaled one or more flow control requests based on a congestion state determined by the one or more NodeBs in response to sending the data.

29. An apparatus for wireless communication, comprising:
at least one processor; and
a memory coupled to the at least one processor, wherein the at least one processor is configured to control:
a receiver configured to receive, at a radio network controller (RNC), a flow control request from one or more NodeBs, wherein each flow control request corresponds to a flow with a user equipment (UE) and the flow is served by a plurality of NodeBs;
a transmitter configured to send data to each of the one or more NodeBs in response to each flow control request; and
the receiver configured to receive, from the one or more NodeBs, a scaled one or more flow control requests by the one or more NodeBs based on a congestion state determined by the one or more NodeBs in response to the transmitter sending the data.

\* \* \* \* \*